US012636595B2

(12) United States Patent

Low et al.

(10) Patent No.: US 12,636,595 B2

(45) Date of Patent: May 26, 2026

(54) METHOD, SYSTEM AND/OR APPARATUS FOR USE OF LIQUID OR FLUID CARBON DIOXIDE IN EXTRACTION AND/OR SOLUBILISING SOURCE MATERIAL AND BINDING AND/OR ELUTION WITH A MOLECULARLY IMPRINTED POLYMER

(71) Applicant: amaea Limited, Auckland (NZ)

(72) Inventors: Aaron Wai Kit Low, Hamilton (NZ); Bryce William Jamieson, Hamilton (NZ)

(73) Assignee: amaea Limited, Auckland (NZ)

( * ) Notice: Subject to any disclaimer, the term of this patent is extended or adjusted under 35 U.S.C. 154(b) by 362 days.

(21) Appl. No.: 18/269,662

(22) PCT Filed: Dec. 24, 2021

(86) PCT No.: PCT/IB2021/062283

§ 371 (c)(1),
(2) Date: Jun. 26, 2023

(87) PCT Pub. No.: WO2022/137206

PCT Pub. Date: Jun. 30, 2022

(65) Prior Publication Data

US 2024/0058726 A1 Feb. 22, 2024

(30) Foreign Application Priority Data

Dec. 24, 2020 (NZ) ........................................ 771592
Sep. 2, 2021 (NZ) ........................................ 779708

(51) Int. Cl.
*B01D 15/42* (2006.01)
*B01D 11/02* (2006.01)
(Continued)

(52) U.S. Cl.
CPC ........ *B01D 15/426* (2013.01); *B01D 11/0203* (2013.01); *B01D 11/0292* (2013.01); *B01D 15/3852* (2013.01); *B01J 20/268* (2013.01)

(58) Field of Classification Search
CPC .............. B01D 15/426; B01D 11/0203; B01D 11/0292; B01D 15/3852; B01D 15/40;
(Continued)

(56) References Cited

U.S. PATENT DOCUMENTS 5,587,273 A 12/1996 Yan et al.
5,786,428 A * 7/1998 Arnold ................. B01J 20/3208
525/330.3
(Continued)

FOREIGN PATENT DOCUMENTS

EP 0816841 A1 * 1/1998 ............. G01N 30/06
EP 2072102 A1 6/2009
(Continued)

OTHER PUBLICATIONS

English translation of EP_0816841_A1, Jan. 7, 1998. (Year: 1998).*
(Continued)

*Primary Examiner* — Joseph W Drodge
(74) *Attorney, Agent, or Firm* — Bradley Arant Boult Cummings LLP; Henry B. Ward, III

(57) ABSTRACT

This disclosure relates to a method/system for associating at least one target molecule with a molecularly imprinted polymer and/or a method/system of obtaining at least one target molecule from a source material. More particularly, this disclosure relates to use of liquid or fluid carbon dioxide in various steps related to use of molecularly imprinted polymers.

19 Claims, 5 Drawing Sheets

(51) Int. Cl.

| | | |
|---|---|---|
| *B01D 15/38* | (2006.01) | |
| *B01J 20/26* | (2006.01) | |

(58) Field of Classification Search

CPC .... B01D 15/12; B01D 15/42; B01D 11/0403; B01D 11/0407; B01D 15/08; B01D 15/102; B01D 15/161; B01D 15/163; B01D 15/1896; B01J 20/268; G01N 30/88

See application file for complete search history.

(56) References Cited

U.S. PATENT DOCUMENTS

| | | | | |
|---|---|---|---|---|
| 9,132,363 | B2 | 9/2015 | Joseph | |
| 10,143,937 | B2 | 12/2018 | Seabrook et al. | |
| 10,189,762 | B1 | 1/2019 | Oroskar et al. | |
| 2009/0191644 | A1 | 7/2009 | Petcu | |
| 2010/0105076 | A1 | 4/2010 | Perollier et al. | |
| 2011/0041859 | A1 * | 2/2011 | Rees | A24B 15/32 |
| | | | | 131/332 |
| 2011/0159160 | A1 | 6/2011 | Jonsson et al. | |
| 2012/0100358 | A1 | 4/2012 | Haupt et al. | |
| 2014/0332015 | A1 | 11/2014 | Bhattacharyya et al. | |
| 2015/0129494 | A1 * | 5/2015 | Joudrey | B01D 15/10 |
| | | | | 210/103 |
| 2015/0361203 | A1 | 12/2015 | Petcu | |
| 2017/0050174 | A1 | 2/2017 | Farr et al. | |
| 2017/0108520 | A1 * | 4/2017 | Kabir | G01N 33/9446 |
| 2023/0348645 | A1 | 11/2023 | Kumar et al. | |

FOREIGN PATENT DOCUMENTS

| | | | | | |
|---|---|---|---|---|---|
| WO | WO-9305068 | A1 * | 3/1993 | | B01J 20/3285 |
| WO | 01/65954 | A1 | 9/2001 | | |
| WO | 01/77672 | A2 | 10/2001 | | |
| WO | 2005/112670 | A1 | 12/2005 | | |
| WO | 2007/107720 | A2 | 9/2007 | | |
| WO | WO-2009068977 | A1 * | 6/2009 | | B01D 63/02 |
| WO | 2011/029889 | A1 | 3/2011 | | |
| WO | 2013/142483 | A1 | 9/2013 | | |
| WO | WO-2014201033 | A1 * | 12/2014 | | B01J 20/28057 |

OTHER PUBLICATIONS

Dimitrios Bitos, "Molecular Imaging for Sample Preparation", Published in LCGC North America, vol. 36, Issue 10, Oct. 1, 2018. (Year: 2018).*

International Searching Authority, "International Search Report," issued in corresponding International Patent Application No. PCT/IB2021/062283 on Mar. 18, 2022, 8 pages.

International Searching Authority, "Written Opinion," issued in corresponding International Patent Application No. PCT/IB2021/062283 on Mar. 18, 2022, 6 pages.

International Bureau, "International Preliminary Report on Patentability," issued in corresponding International Patent Application No. PCT/IB2021/062283 on Jun. 13, 2023, 7 pages.

Ansell et al., "Imprinted polymers for chiral resolution of (+)–ephedrine, 4: Packed column supercritical fluid chromatography using molecularly imprinted chiral stationary phases," Journal of Chromatography A, 1264 (2012), pp. 117-123.

Ellwanger et al., "Evaluation of methods aimed at complete removal of template from molecularly imprinted polymers," The Analyst (The Royal Society of Chemistry), Mar. 26, 2001, 126, pp. 784-792.

Lamaoui et al., "Molecularly imprinted polymers: A closer look at the template removal and analyte binding," Biosensors and Bioelectronics, 243 (2024), 115774, pp. 1-20.

Lorenzo et al., "To Remove or Not to Remove? The Challenge of Extracting the Template to Make the Cavities Available in Molecularly Imprinted Polymers (MIPS)," International Journal of Molecular Sciences, Jul. 5, 2011, 12, pp. 4327-4347.

Gomes et al., "Preparation of Molecularly Imprinted Adsorbents with Improved Retention Capability of Polyphenols and Their Application in Continuous Separation Processes," Chromatographia, vol. 82, Issue 6, Springer-Verlag GmbH Germany, May 6, 2019, pp. 893-916.

Sixth Wave Innovations Inc., "Sixth Wave Inc.—Part 1—Affinity Cannabis Extraction," (Aristotle Kalivretenos, Ph.D), https://youtu.be/lny-j2qvp8Y (published Nov. 16, 2019; retrieved Feb. 3, 2023).

Sixth Wave Innovations Inc., "Sixth Wave Inc.—Part 2—Affinity Cannabis Extraction," (Aristotle Kalivretenos, Ph.D), https://youtu.be/A9vJlfjpKPo (published Nov. 16, 2019; retrieved Feb. 3, 2023).

* cited by examiner

METHOD, SYSTEM AND/OR APPARATUS FOR USE OF LIQUID OR FLUID CARBON DIOXIDE IN EXTRACTION AND/OR SOLUBILISING SOURCE MATERIAL AND BINDING AND/OR ELUTION WITH A MOLECULARLY IMPRINTED POLYMER

TECHNICAL FIELD

This disclosure relates to a method/system for associating at least one target molecule with a molecularly imprinted polymer and/or a method/system of obtaining at least one target molecule from a source material. More particularly, this disclosure relates to use of liquid or fluid carbon dioxide in various steps related to use of molecularly imprinted polymers.

BACKGROUND ART

Various plant extracts have useful properties, for example as drugs, therapeutics, flavourings, colourants, supplements, cosmetics. Plants extracts can be obtained in a number of ways including solvent extractions, distillations and chromatography. However, as plants generally contain a complex mixture of components and compounds, multiple types and selective extraction techniques may be required. Further the extraction techniques can have a detrimental effect on the plant extract, particularly where high temperatures are used and/or use large volumes of solvents.

Carbon dioxide is a gas solvent which will be in liquid form at certain temperatures and pressures. Supercritical carbon dioxide ($sCO_2$) is a fluid state of carbon dioxide where it is held at or above its critical temperature and critical pressure. Compared to other forms of extraction, supercritical carbon dioxide ($CO_2$) extraction is a relatively gentle and non-toxic, and the $CO_2$ solvent can be easily separated from the extract by evaporation. However, supercritical carbon dioxide ($CO_2$) extraction does require relatively specialised equipment.

Use of molecularly imprinted polymers as a stationary phase for chromatography is a relatively newer extraction technique. Molecularly-imprinted polymers (MIP or "imprinted polymer") are polymers with an antibody-like ability to bind and discriminate between molecules. Molecularly-imprinted polymers are formed by the synthesis of cross-linked polymers in the presence of a template molecule. The template molecule is then removed leaving behind a structure in the polymer complementary to the template molecule, for example a "pocket" or other complimentary binding area. The imprinted polymer may bind molecules/extracts of interest in the pocket or binding area covalently or non-covalently, for example, with hydrogen bonding, other electrostatic interactions, aromatic stacking or hydrophobic effects. MIPs are generally used for small, lab-scale analytical, separation and sensor applications as a means for achieving selectivity. If MIPs are used for separation at commercial/industrial scale, volumes of solvent used to elute bound targets from the MIP can become large volumes and, in some cases, make large scale application of MIPs unfeasible. The solvents used are often volatile and/or flammable and/or toxic. Use of such solvent therefore involves safety risks with storage and transport and specialist solvent recovery equipment to reduce the environmental impact.

EP2072102 discloses a method involving passing a liquid starting material e.g. rape oil, over a column such that at least one accompanying fat substance e.g. triterpene, is adsorbed partially on a material with molecular recognition (MIM) e.g. polymer. The material with molecular recognition is contacted with a liquid, gaseous or vaporous solvent i.e. supercritical fluid, such that the fat associated material is desorbed and partially dissolved in the liquid, gaseous or vaporous solvent. The solvent is separated from the fat associated material. The starting material is selected from the group consisting of rape oil, palm oil, sunflower oil, cotton seed oil, groundnut oil, maize oil, olive oil, linseed oil, soya bean oil, oil methyl ester, fatty acid distillate from the biodiesel production and/or the production of oil and glycerine phase from the biodiesel production and/or the production of oils. A liquid, near-critical or supercritical solvent, for example supercritical $CO_2$, supercritical $H_2O$ and supercritical propane, is mentioned as a possible extraction agent for desorption of the accompanying fat substance from the MIM. No further details of the liquid, near-critical or supercritical solvent are given.

WO01/65954 discloses method of treating tobacco to reduce or eliminate nitrosamines therefrom. The method comprises the use of a supercritical fluid extraction medium at elevated temperature and pressure to selectively remove nitrosamines compared with nicotine removal. The tobacco is subjected to treatment with a supercritical fluid extraction medium to extract nitrosamines from the tobacco. The nitrosamines are separated from the supercritical fluid extraction medium by subjecting the extraction medium to a chemisorption step.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY

It is an object of this disclosure to provide a method for associating at least one target molecule with a molecularly imprinted polymer, a system for associating at least one target molecule with a molecularly imprinted polymer, a method of obtaining at least one target molecule from a source material, and/or a system for obtaining at least one target molecule from a source material, which goes at least some way towards overcoming one or more of the above-mentioned problems or difficulties, or to at least provide the industry/public with a useful choice.

In a first aspect there is provided a method for associating at least one target molecule with a molecularly imprinted polymer, the method comprising:

i) solubilising a source material in liquid or fluid carbon dioxide and ii) bringing the solubilised source material in the liquid or fluid carbon dioxide into contact with a molecularly imprinted polymer (MIP) to associate at least one target molecule present in the source material with the molecularly imprinted polymer, wherein the liquid or fluid carbon dioxide is at a first pressure and temperature combination when solubilising the source material and at a second pressure and temperature combination when bringing the solubilised source material into contact with the molecularly imprinted polymer (MIP).

In a second aspect there is provided a system for associating at least one target molecule with a molecularly imprinted polymer, the system comprising:

a molecularly imprinted polymer, at least one device for providing a flow of liquid or fluid carbon dioxide at a first pressure and temperature combination and a second pressure and temperature combination, wherein the system is adapted to solubilise a source material in the liquid or fluid carbon dioxide, and wherein the system is adapted to bring the solubilised source material into contact with a molecularly imprinted polymer to associate at least one target molecule present in the source material with the molecularly imprinted polymer, wherein the liquid or fluid carbon dioxide is at the first pressure and temperature combination when solubilising the source material and at the second pressure and temperature combination when bringing the solubilised source material into contact with the molecularly imprinted polymer (MIP).

For the avoidance of doubt the following embodiments may apply alone or in any combination of two or more thereof to any one or more of the first and second aspects set forth above where the context allows.

In an embodiment the first pressure and temperature combination is about 7.4 MPa to 35 MPa and about 31° C. to 80° C. or about 0.5 MPa to 41 MPa and about −50° C. to 30° C.

In an embodiment the liquid or fluid carbon dioxide at the first pressure and temperature combination is supercritical carbon dioxide. In an embodiment the first pressure and temperature combination is about 7.4 MPa to 35 MPa and about 31° C. to 80° C. In an embodiment the first pressure and temperature combination is about 20 to 35 MPa and about 31 to 50° C. In an embodiment the first pressure and temperature combination is about 25 to 35 MPa and about 35 to 50° C.

In an embodiment the liquid or fluid carbon dioxide at the first pressure and temperature combination is subcritical carbon dioxide. In an embodiment the first pressure and temperature combination is about 0.5 MPa to 41 MPa and about −50° C. to 30° C. In an embodiment the first pressure and temperature combination is about 5 MPa to 30 MPa and about −10° C. to 25° C. In an embodiment the first pressure and temperature combination is about 7 MPa to 15 MPa and about 10° C. to 25° C.

In an embodiment the liquid or fluid carbon dioxide at the second pressure and temperature combination is supercritical carbon dioxide.

In an embodiment the liquid or fluid carbon dioxide at the second pressure and temperature combination is subcritical carbon dioxide.

In an embodiment the second pressure and temperature combination is about 7.4 MPa to 100 MPa and about 31° C. to 120° C. or about 0.5 MPa to 41 MPa and about −50° C. to 30° C.

In an embodiment the second pressure and temperature combination is about 7.4 MPa to 100 MPa and about 31° C. to 120° C. In an embodiment the second pressure and temperature combination is about 8 to 13 MPa and about 37 to 63° C. In an embodiment the second pressure and temperature combination is about 9 to 12 MPa and about 37 to 55° C.

In an embodiment the second pressure and temperature combination is about 0.5 MPa to 41 MPa and about −50° C. to 30° C. In an embodiment the second pressure and temperature combination is about 3 MPa to 20 MPa and about −25° C. to 20° C. In an embodiment the second pressure and temperature combination is about 5 MPa to 10 MPa and about 0° C. to 13° C.

In some embodiments the liquid or fluid carbon dioxide at the first pressure and temperature has a higher density than the liquid or fluid carbon dioxide at the second pressure and temperature combination.

In a third aspect there is provided a method for associating at least one target molecule with a molecularly imprinted polymer, the method comprising:

i) solubilising a source material in liquid or fluid carbon dioxide and ii) bringing the solubilised source material in liquid or fluid carbon dioxide into contact with a molecularly imprinted polymer (MIP) to associate at least one target molecule present in the source material with the molecularly imprinted polymer, wherein the liquid or fluid carbon dioxide is at a first density when solubilising the source material and at a second density when bringing the solubilised source material into contact with a molecularly imprinted polymer (MIP);

wherein the first density is different to the second density.

In a fourth aspect there is provided a system for associating at least one target molecule with a molecularly imprinted polymer, the system comprising:

a molecularly imprinted polymer (MIP), at least one device for providing a flow of liquid or fluid carbon dioxide at a first density and a second density, wherein the system is adapted to solubilise a source material in the liquid or fluid carbon dioxide, and wherein the system is adapted to bring the solubilised source material into contact with a molecularly imprinted polymer to associate at least one target molecule present in the source material with the molecularly imprinted polymer, wherein the liquid or fluid carbon dioxide is at the first density when solubilising the source material and at the second density when bringing the solubilised source material into contact with the molecularly imprinted polymer (MIP), wherein the first density is different to the second density.

In a fifth aspect there is provided a method for associating at least one target molecule with a molecularly imprinted polymer, the method comprising:

i) solubilising a source material in liquid or fluid carbon dioxide and ii) bringing the solubilised source material in liquid or fluid carbon dioxide into contact with a molecularly imprinted polymer (MIP) to associate at least one target molecule present in the source material with the molecularly imprinted polymer, wherein the liquid or fluid carbon dioxide is at a first density when solubilising the source material and at a second density when bringing the solubilised source material into contact with a molecularly imprinted polymer (MIP);

wherein the first density is higher than the second density.

In a sixth aspect there is provided a system for associating at least one target molecule with a molecularly imprinted polymer, the system comprising:

a molecularly imprinted polymer (MIP), at least one device for providing a flow of liquid or fluid carbon dioxide at a first density and a second density, wherein the system is adapted to solubilise a source material in the liquid or fluid carbon dioxide, and wherein the system is adapted to bring the solubilised source material into contact with a molecularly imprinted polymer to associate at least one target molecule present in the source material with the molecularly imprinted polymer, wherein the liquid or fluid carbon dioxide is at the first density when solubilising the source material and at the second density when bringing the solubilised source material into contact with the molecularly imprinted polymer (MIP), wherein the first density is higher than the second density.

For the avoidance of doubt the following embodiments may apply alone or in any combination of two or more thereof to any one or more of the first, second, third, fourth, fifth and/or sixth aspects set forth above where the context allows.

In some embodiments the first density is about 0.4 to 1.0 g/cm$^3$. In some embodiments the first density is about 0.6 to 1.0 g/cm$^3$. In some embodiments the first density is about 0.7 to 1.0 g/cm$^3$. In some embodiments the first density is about 0.8 to 1.0 g/cm$^3$. In some embodiments the first density is about 0.8 to 0.9 g/cm$^3$. In some embodiments the first density is about 0.01 to 1.3 g/cm$^3$. In some embodiments the first density is about 0.3 to 1.0 g/cm$^3$. In some embodiments the first density is about 0.7 to 1.0 g/cm$^3$.

In an embodiment the liquid or fluid carbon dioxide at the first density is supercritical carbon dioxide. In an embodiment the supercritical carbon dioxide has a density of about 0.4 to 1.0 g/cm$^3$. In an embodiment the supercritical carbon dioxide has a density of about 0.6 to 1.0 g/cm$^3$. In an embodiment the supercritical carbon dioxide has a density of about 0.7 to 1.0 g/cm$^3$. In an embodiment the supercritical carbon dioxide has a density of about 0.8 to 1.0 g/cm$^3$. In an embodiment the supercritical carbon dioxide has a density of about 0.8 to 0.9 g/cm$^3$.

In an embodiment the liquid or fluid carbon dioxide at the first density is subcritical carbon dioxide. In an embodiment the subcritical carbon dioxide has a density of about 0.01 to 1.3 g/cm$^3$. In an embodiment the subcritical carbon dioxide has a density of about 0.3 to 1.0 g/cm$^3$. In an embodiment the subcritical carbon dioxide has a density of about 0.7 to 1.0 g/cm$^3$.

In some embodiments the second density is about 0.1 to 1.2 g/cm$^3$. In some embodiments the second density is about 0.1 to 0.8 g/cm$^3$. In some embodiments the second density is about 0.2 to 0.7 g/cm$^3$. In some embodiments the second density is about 0.3 to 0.6 g/cm$^3$. In some embodiments the second density is about 0.01 to 1.3 g/cm$^3$. In some embodiments the second density is about 0.3 to 1.0 g/cm$^3$. In some embodiments the second density is about 0.8 to 1.0 g/cm$^3$.

In an embodiment the liquid or fluid carbon dioxide at the second density is supercritical carbon dioxide. In an embodiment the supercritical carbon dioxide has a density of about 0.1 to 1.2 g/cm$^3$. In an embodiment the supercritical carbon dioxide has a density of about 0.1 to 1.0 g/cm$^3$. In an embodiment the supercritical carbon dioxide has a density of about 0.2 to 0.7 g/cm$^3$.

In an embodiment the liquid or fluid carbon dioxide at the second density is subcritical carbon dioxide. In an embodiment the subcritical carbon dioxide has a density of about 0.01 to 1.3 g/cm$^3$. In an embodiment the subcritical carbon dioxide has a density of about 0.4 to 1.0 g/cm$^3$. In an embodiment the subcritical carbon dioxide has a density of about 0.8 to 1.0 g/cm$^3$.

In some embodiments the source material is an organic or inorganic material.

In some embodiments the source material is any one or more of a liquid, a wax, an oil, a solid.

In some embodiments the source material is an extract of an animal, plant or synthetic source material.

In an embodiment the source material is an extract of a fungus, plant seed, plant fruit, plant root, plant stem and/or leaf, algae, fish.

In some embodiments the source material is crude cannabis extract. In some embodiments the crude cannabis extract is winterised or non-winterised.

In some embodiments the liquid or fluid carbon dioxide solubilising the source material flows at a flow rate of about 0.1 to 150 column volumes per hour, or about 0.5 to 50 column volumes per hour, or about 0.5 to 20 column volumes per hour, or about 1 to 10 column volumes per hour.

In some embodiments the liquid or fluid carbon dioxide bringing the solubilised source material into contact with the MIP flows at a flow rate of about 0.1 to 150 column volumes per hour. In some embodiments the liquid or fluid carbon dioxide bringing the solubilised source material into contact with the MIP flows at a flow rate of about 0.1 to 50 column volumes per hour. In some embodiments the liquid or fluid carbon dioxide bringing the solubilised source material into contact with the MIP flows at a flow rate of about 0.1 to 20 column volumes per hour. In some embodiments the liquid or fluid carbon dioxide bringing the solubilised source material into contact with the MIP flows at a flow rate of about 0.5 to 10 column volumes per hour.

In an embodiment the source material is solubilised in the carbon dioxide by extracting the source material from a solid material using supercritical carbon dioxide.

In an embodiment the source material is solubilised in the carbon dioxide by extracting the source material from a solid material using supercritical carbon dioxide at pressure of about 7.4 MPa to 35 MPa and about 31° C. to 80° C. In an embodiment the source material is solubilised in the carbon dioxide by extracting the source material from a solid material using supercritical carbon dioxide at pressure of about 20 to 35 MPa and temperature of about 31 to 50° C. In an embodiment the source material is solubilised in the carbon dioxide by extracting the source material from a solid material using supercritical carbon dioxide at pressure of about 25 to 35 MPa and about 35 to 50° C.

In an embodiment the source material is solubilised in the carbon dioxide by extracting the source material from a solid material using supercritical carbon dioxide at density of about 0.4 to 1.0 g/cm$^3$. In an embodiment the source material is solubilised in the carbon dioxide by extracting the source material from a solid material using super-critical carbon dioxide at density of about 0.6 to 1.0 g/cm$^3$. In an embodiment the source material is solubilised in the carbon dioxide by extracting the source material from a solid material using supercritical carbon dioxide at density of about 0.7 to 1.0 g/cm$^3$. In an embodiment the source material is solubilised in the carbon dioxide by extracting the source material from a solid material using supercritical carbon dioxide at density of about 0.8 to 1.0 g/cm$^3$.

In an embodiment the source material is solubilised in the carbon dioxide by extracting the source material from a solid material using subcritical carbon dioxide.

In an embodiment the source material is solubilised in the carbon dioxide by extracting the source material from a solid material using subcritical carbon dioxide at pressure of about 0.5 MPa to 41 MPa and temperature of about −50° C. to 30° C. In an embodiment the source material is solubilised in the carbon dioxide by extracting the source material from a solid material using subcritical carbon dioxide at pressure of about 5 MPa to 30 MPa and a temperature of about −10° C. to 25° C. In an embodiment the source material is solubilised in the carbon dioxide by extracting the source material from a solid material using subcritical carbon dioxide at pressure of about 7 MPa to 15 MPa and a temperature of about 10° C. to 25° C.

In some embodiments the source material is solubilised in the carbon dioxide by extracting the source material from a solid material using subcritical carbon dioxide at density of about 0.01 to 1.3 g/cm$^3$. In some embodiments the source material is solubilised in the carbon dioxide by extracting the source material from a solid material using subcritical carbon dioxide at density of about 0.3 to 1.0 g/cm$^3$. In some embodiments the source material is solubilised in the carbon dioxide by extracting the source material from a solid material using subcritical carbon dioxide at density of about 0.7 to 1.0 g/cm$^3$.

In an embodiment the solid material is an animal or plant material.

In an embodiment the solid material is selected from a fungus, plant seed, plant fruit, plant root, plant stem and/or leaf, algae, fish.

In some embodiments solid material is selected from coffee beans, kava plant, cannabis plant, mushroom, kiwi fruit, avocado, hops, tobacco, tea, grapes, blackcurrant, any one of which being whole or parts of.

In some embodiments the plant material is cannabis plant material.

In some embodiments the solubilising the source material in liquid or fluid carbon dioxide further comprises at least one co-solvent.

In some embodiments the co-solvent is selected from one or more of water, ethanol, methanol, ethyl acetate, isopropyl alcohol, acetonitrile, acetone, THF.

In some embodiments the system comprises at least one device for providing a flow of co-solvent and means to combine the co-solvent with the flow of carbon dioxide.

In some embodiments the solubilised source material is brought into contact with a molecularly imprinted polymer (MIP) in liquid or fluid carbon dioxide and at least one co-solvent.

In some embodiments the co-solvent is selected from one or more of water, ethanol, methanol, ethyl acetate, isopropyl alcohol, acetonitrile, acetone, THF.

In some embodiments the co-solvent is greater than 0% to about 75% of mass flow rate of the liquid or fluid carbon dioxide.

In some embodiments the co-solvent is greater than 0% to about 70% of mass flow rate of the liquid or fluid carbon dioxide.

In some embodiments the co-solvent is greater than 0% to about 60% of mass flow rate of the liquid or fluid carbon dioxide.

In some embodiments the co-solvent is greater than 0% to about 50% of mass flow rate of the liquid or fluid carbon dioxide.

In some embodiments of the method the step (i) is carried out in a separate vessel to step (ii).

In some embodiments of the method step (i) and step (ii) are carried out in the same vessel.

In some embodiments of the method step (i) and step (ii) are carried out in the same vessel and the source material is located in a first portion of the vessel and the MIP is located in a second portion of the vessel, wherein the first and second portions are in fluid connection.

In some embodiments of the method step (i) and step (ii) are carried out in the same vessel and the solid material is located in a first portion of the vessel and the MIP is located in a second portion of the vessel, wherein the first and second portions are in fluid connection.

In some embodiments of the system the MIP is contained in a separate vessel to the source material.

In some embodiments of the system the MIP and the source material are contained in single vessel.

In some embodiments the MIP and the source material are contained in the same vessel and the source material is located in a first portion of the vessel and the MIP is located in a second portion of the vessel, wherein the first and second portions are in fluid connection.

In some embodiments where the source material is extracted from a solid material the solid material is located in a first portion of the vessel and the MIP is located in a second portion of the vessel, wherein the first and second portions are in fluid connection.

In some embodiments the first and second portions are at least partially separated by a partition.

In some embodiments the molecularly imprinted polymer (MIP) is a cross-linked polyester resin.

In some embodiments the molecularly imprinted polymer (MIP) is a non-covalently imprinted molecularly imprinted polymer, or a covalently imprinted molecularly imprinted polymer.

In some embodiments the molecularly imprinted polymer (MIP) is a molecular recognition polymer.

In some embodiments the molecularly imprinted polymer (MIP) non-covalently associates with the target molecule.

In some embodiments the molecularly imprinted polymer has been prepared from one or more polymerizable monomers.

In some embodiments the one or more polymerizable monomer are selected from an acrylate or a vinyl.

In some embodiments the acrylate monomer is a methacryl monomer.

In some embodiments the vinyl monomer is selected from a styryl or vinylpyridine.

In some embodiments the imprinted polymer is in the form of a bead.

In some embodiments the bead is about 0.1 to 10 mm in diameter. In some embodiments the bead is about 0.2 to 8 mm in diameter. In some embodiments the bead is about 0.2 to 6 mm in diameter. In some embodiments the bead is about 0.2 to 5 mm in diameter. In some embodiments the bead is about 0.2 to 6 mm in diameter. In some embodiments the bead is about 0.2 to 4 mm in diameter. In some embodiments the bead is about 0.2 to 3 mm in diameter. In some embodiments the bead is about 0.2 to 2 mm in diameter. In some embodiments the bead is about 0.5-2 mm diameter. In some embodiments the bead is about 0.5 to 1.5 mm in diameter.

In some embodiments about 99% of the beads are about 0.1 to 10 mm in diameter. In some embodiments about 95% of the beads are about 0.1 to 10 mm in diameter. In some embodiments about 90% of the beads are about 0.1 to 10 mm in diameter. In some embodiments about 85% of the beads are about 0.1 to 10 mm in diameter.

In some embodiments the bead has compression strength of about 300-13,800 psi.

In some embodiments the method further comprises a rinse step comprising rinsing the MIP with a rinse solvent to reduce fouling of the MIP from the source material.

In some embodiments the rinse solvent is selected from one or more of water, ethanol, liquid or fluid carbon dioxide, methanol, ethyl acetate, isopropyl alcohol, acetonitrile, acetone, THF.

In some embodiments the rinse solvent is ethanol and water. In some embodiments the rinse solvent is about 10-30% ethanol and about 70-90% water by volume. In some embodiments the rinse solvent is 20% ethanol and 80% water by volume.

In some embodiments the rinse solvent is liquid or fluid carbon dioxide.

In some embodiments the method further comprises the step of purging the MIP to remove/reduce residue rinse solvent from the MIP and/or vessel the MIP are contained in.

In some embodiments the purge step comprises passing low pressure compressed $CO_2$ over the MIP following the rinse step.

In some embodiments the low pressure compressed $CO_2$ has a pressure of about 10-20 psi.

In some embodiments the method further comprises the step of eluting the at least one target molecule off the MIP using an elution solvent.

In some embodiments the system is further adapted to elute the at least one target molecule off the MIP using an elution solvent.

In some embodiments the elution solvent is one or more of liquid or fluid carbon dioxide, water, ethanol, methanol, ethyl acetate, isopropyl alcohol, acetonitrile, acetone, THF.

In some embodiments the elution solvent is liquid or fluid carbon dioxide with or without at least one co-solvent.

In some embodiments the co-solvent is selected from one or more of water, ethanol, methanol, ethyl acetate, isopropyl alcohol, acetonitrile, acetone, THF.

In some embodiments the liquid or fluid carbon dioxide used as an elution solvent is at a higher density than the second density.

In some embodiments the liquid or fluid carbon dioxide used as an elution solvent has a density of about 0.6 to 1.0 $g/cm^3$.

In some embodiments the liquid or fluid carbon dioxide used as an elution solvent is supercritical carbon dioxide.

In some embodiments the carbon dioxide is at a pressure of above about 7 MPa and temperature of above about 31° C. In some embodiments the carbon dioxide is at a pressure of about 7 to 100 MPa and a temperature of about 31 to 70° C. In some embodiments the carbon dioxide is at a pressure of about 7 to 55 MPa and a temperature of about 31 to 70° C. In some embodiments the carbon dioxide is at a pressure of about 7 to 35 MPa and a temperature of about 31 to 70° C. In some embodiments the carbon dioxide is at a pressure of about 10 to 35 MPa and a temperature of about 31 to 70° C. In some embodiments the carbon dioxide is at a pressure of about 10 to 35 MPa and a temperature of about 40 to 70° C. In some embodiments the carbon dioxide is at a pressure of about 20 to 35 MPa and temperature of about 40 to 70° C. In some embodiments the carbon dioxide is at a pressure of about 25 MPa to 35 MPa and temperature of about 35° C. to 50° C.

In some embodiments the carbon dioxide has a density of about 0.2 $g/cm^3$ to 1.0 $g/cm^3$. In some embodiments the carbon dioxide has a density of about 0.4 $g/cm^3$ to 1.0 $g/cm^3$. In some embodiments the carbon dioxide has a density of about 0.6 $g/cm^3$ to 1.0 $g/cm^3$. In some embodiments the carbon dioxide has a density of about 0.8 $g/cm^3$ to 1.0 $g/cm^3$.

In some embodiments the liquid or fluid carbon dioxide used as an elution solvent is subcritical carbon dioxide.

In some embodiments the carbon dioxide is at a pressure of about 0.5 to 41 MPa and temperature of about −50 to 30° C. In some embodiments the carbon dioxide is at a pressure of about 5 to 30 MPa and temperature of about −10 to 25°

C. In some embodiments the carbon dioxide is at a pressure of about 7 to 15 MPa and temperature of about 10 to 25° C.

In some embodiments the carbon dioxide has a density of about 0.01 $g/cm^3$ to 1.3 $g/cm^3$. In some embodiments the carbon dioxide has a density of about 0.1 $g/cm^3$ to 1.1 $g/cm^3$. In some embodiments the carbon dioxide has a density of about 0.2 $g/cm^3$ to 1.0 $g/cm^3$. In some embodiments the carbon dioxide has a density of about 0.5 $g/cm^3$ to 1.0 $g/cm^3$. In some embodiments the carbon dioxide has a density of about 0.7 $g/cm^3$ to 1.0 $g/cm^3$.

In some embodiments the elution solvent elutes at a flow rate of about 30 to 120 mL min−1.

In some embodiments the elution solvent is ethanol

In some embodiments the elution solvent is liquid or fluid carbon dioxide and the elution solvent elutes at a flow rate of about 0.1 to 150 column volumes per hour. In some embodiments the liquid or fluid carbon dioxide elutes at a flow rate of about 0.1 to 50 column volumes per hour. In some embodiments the liquid or fluid carbon dioxide elutes at a flow rate of about 0.5 to 10 column volumes per hour. In some embodiments the liquid or fluid carbon dioxide elutes at a flow rate of about 0.5 to 5 column volumes per hour.

In a seventh aspect there is provided a method of obtaining at least one target molecule from a source material, the method comprising:

a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent, wherein the liquid or fluid carbon dioxide used as an elution solvent is a pressure of above about 7 MPa and a temperature of above about 31° C., or wherein the liquid or fluid carbon dioxide used as an elution solvent is at a pressure of about 0.5 to 41 MPa and a temperature of about −50 to 30° C.

In an eighth aspect there is provided a system for obtaining at least one target molecule from a source material, the system comprising:

a molecularly imprinted polymer, a device for providing a flow of liquid or fluid carbon dioxide, wherein the system is adapted to bring a source material into contact with a molecularly imprinted polymer to associate at least one target molecule present in the source material with the molecularly imprinted polymer, and wherein the system is adapted to elute the target molecule that is associated with the molecularly imprinted polymer using the flow of liquid or fluid carbon dioxide as an elution solvent, and wherein the carbon dioxide is at a pressure of above about 7 MPa and temperature of above about 31° C., or wherein the carbon dioxide is at a pressure of about 0.5 to 41 MPa and a temperature of about −50 to 30° C.

In a nineth aspect there is provided a method of obtaining at least one target molecule from a source material, the method comprising:

a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent, wherein the liquid or fluid carbon dioxide used as an elution solvent is at a pressure of above about 7 MPa and a temperature of above about 31° C.

In a tenth aspect there is provided a system for obtaining at least one target molecule from a source material, the system comprising:

a molecularly imprinted polymer, a device for providing a flow of liquid or fluid carbon dioxide, wherein the system is adapted to bring a source material into contact with a molecularly imprinted polymer to associate at least one target molecule present in the source material with the molecularly imprinted polymer, and wherein the system is adapted to elute the target molecule that is associated with the molecularly imprinted polymer using the flow of liquid or fluid carbon dioxide as an elution solvent, and wherein the carbon dioxide is at a pressure of above about 7 MPa and temperature of above about 31° C.

In some embodiments the liquid or fluid carbon dioxide used as an elution solvent is a pressure of about 7 to 100 MPa and a temperature of about 31 to 70° C. In some embodiments the liquid or fluid carbon dioxide used as an elution solvent is a pressure of about 7 to 55 MPa and a temperature of about 31 to 70° C. In some embodiments the liquid or fluid carbon dioxide used as an elution solvent is a pressure of about 7 to 35 MPa and a temperature of about 31 to 70° C. In some embodiments the liquid or fluid carbon dioxide used as an elution solvent is a pressure of about 10 to 35 MPa and a temperature of about 31 to 70° C. In some embodiments the liquid or fluid carbon dioxide used as an elution solvent is a pressure of about 10 to 35 MPa and a temperature of about 40 to 70° C. In some embodiments the carbon dioxide is at a pressure of about 20 to 35 MPa and temperature of about 40 to 70° C. In some embodiments the carbon dioxide is at a pressure of about 25 MPa to 35 MPa and temperature of about 35° C. to 50° C.

In an eleventh aspect there is provided a method of obtaining at least one target molecule from a source material, the method comprising:

a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent, wherein the liquid or fluid carbon dioxide used as an elution solvent is at a pressure of about 0.5 to 41 MPa and a temperature of about −50 to 30° C.

In a twelfth aspect there is provided a system for obtaining at least one target molecule from a source material, the system comprising:

a molecularly imprinted polymer, a device for providing a flow of liquid or fluid carbon dioxide, wherein the system is adapted to bring a source material into contact with a molecularly imprinted polymer to associate at least one target molecule present in the source material with the molecularly imprinted polymer, and wherein the system is adapted to elute the target molecule that is associated with the molecularly imprinted polymer using the flow of liquid or fluid carbon dioxide as an elution solvent, and wherein the carbon dioxide is at a pressure of about 0.5 to 41 MPa and a temperature of about −50 to 30° C.

In some embodiments the liquid or fluid carbon dioxide is at a pressure of about 0.5 to 41 MPa and temperature of about −50 to 30° C. In some embodiments the liquid or fluid carbon dioxide is at a pressure of about 5 to 30 MPa and temperature of about −10 to 25° C. In some embodiments the liquid or fluid carbon dioxide is at a pressure of about 7 to 15 MPa and temperature of about 10 to 25° C.

In a thirteenth aspect there is provided a method of obtaining at least one target molecule from a source material, the method comprising:

a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent, wherein the liquid or fluid carbon dioxide used as an elution solvent has a density of about 0.2 to 1.0 g/cm$^3$, or wherein the liquid or fluid carbon dioxide used as an elution solvent has a density of about 0.01 to 1.3 g/cm$^3$.

In a fourteenth aspect there is provided a system for obtaining at least one target molecule from a source material, the system comprising:

a molecularly imprinted polymer, a device for providing a flow of liquid or fluid carbon dioxide, wherein the system is adapted to bring a source material into contact with a molecularly imprinted polymer to associate at least one target molecule present in the source material with the molecularly imprinted polymer, and wherein the system is adapted to elute the target molecule that is associated with the molecularly imprinted polymer using the flow of liquid or fluid carbon dioxide as an elution solvent, wherein the carbon dioxide has a density of about 0.2 to 1.0 g/cm$^3$, or wherein the system is adapted to elute the target molecule that is associated with the molecularly imprinted polymer using the flow of liquid or fluid carbon dioxide as an elution solvent, wherein the carbon dioxide has a density of about 0.01 to 1.3 g/cm$^3$.

In a fifteenth aspect there is provided a method of obtaining at least one target molecule from a source material, the method comprising:

a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent, wherein the liquid or fluid carbon dioxide used as an elution solvent has a density of about 0.2 to 1.0 g/cm$^3$.

In a sixteenth aspect there is provided a system for obtaining at least one target molecule from a source material, the system comprising:

a molecularly imprinted polymer, a device for providing a flow of liquid or fluid carbon dioxide, wherein the system is adapted to bring a source material into contact with a molecularly imprinted polymer to associate at least one target molecule present in the source material with the molecularly imprinted polymer, and wherein the system is adapted to elute the target molecule that is associated with the molecularly imprinted polymer using the flow of liquid or fluid carbon dioxide as an elution solvent, wherein the carbon dioxide has a density of about 0.2 to 1.0 g/cm³.

In some embodiments the liquid or fluid carbon dioxide used as an elution solvent is supercritical carbon dioxide. In some embodiments the liquid or fluid carbon dioxide used as an elution solvent has a density of about 0.4 to 1.0 g/cm³. In some embodiments the liquid or fluid carbon dioxide used as an elution solvent has a density of about 0.6 to 1.0 g/cm³. In some embodiments the liquid or fluid carbon dioxide used as an elution solvent has a density of about 0.8 to 1.0 g/cm³.

In a seventeenth aspect there is provided a method of obtaining at least one target molecule from a source material, the method comprising:

a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent, wherein the liquid or fluid carbon dioxide used as an elution solvent has a density of about 0.01 to 1.3 g/cm³.

In an eighteenth aspect there is provided a system for obtaining at least one target molecule from a source material, the system comprising:

a molecularly imprinted polymer, a device for providing a flow of liquid or fluid carbon dioxide, wherein the system is adapted to bring a source material into contact with a molecularly imprinted polymer to associate at least one target molecule present in the source material with the molecularly imprinted polymer, and wherein the system is adapted to elute the target molecule that is associated with the molecularly imprinted polymer using the flow of liquid or fluid carbon dioxide as an elution solvent, wherein the carbon dioxide has a density of about 0.01 to 1.3 g/cm³.

In some embodiments the liquid or fluid carbon dioxide used as an elution solvent is subcritical carbon dioxide. In some embodiments the liquid or fluid carbon dioxide used as an elution solvent has a density of about 0.1 to 1.1 g/cm³. In some embodiments the liquid or fluid carbon dioxide used as an elution solvent has a density of about 0.2 to 1.1 g/cm³. In some embodiments the liquid or fluid carbon dioxide used as an elution solvent has a density of about 0.2 to 1.0 g/cm³. In some embodiments the liquid or fluid carbon dioxide used as an elution solvent has a density of about 0.5 to 1.0 g/cm³. In some embodiments the liquid or fluid carbon dioxide used as an elution solvent has a density of about 0.7 to 1.0 g/cm³.

For the avoidance of doubt the following embodiments may apply alone or in any combination of two or more thereof to any one or more of the seventh, eighth, ninth, tenth, eleventh, twelfth, thirteenth, fourteenth, fifteenth, sixteenth, seventeenth, and eighteenth aspects set forth above where the context allows.

In some embodiments the elution solvent elutes at a flow rate of about 30 to 120 mL min⁻¹.

In some embodiments the liquid or fluid carbon dioxide elutes at a flow rate of about 0.1 to 150 column volumes per hour. In some embodiments the liquid or fluid carbon dioxide elutes at a flow rate of about 0.5 to 50 column volumes per hour. In some embodiments the liquid or fluid carbon dioxide elutes at a flow rate of about 0.5 to 20 column volumes per hour. In some embodiments the liquid or fluid carbon dioxide elutes at a flow rate of about 0.5 to 5 column volumes per hour.

In some embodiments the elution solvent further comprises at least one co-solvent.

In some embodiments the co-solvent is selected from one or more of water, ethanol, methanol, ethyl acetate, isopropyl alcohol, acetonitrile, acetone, THF.

In some embodiments the co-solvent is greater than 0% to about 75% of mass flow rate of the liquid or fluid carbon dioxide elution solvent.

In some embodiments the co-solvent is greater than 0% to about 70% of mass flow rate of the liquid or fluid carbon dioxide elution solvent.

In some embodiments the co-solvent is greater than 0% to about 60% of mass flow rate of the liquid or fluid carbon dioxide elution solvent.

In some embodiments the co-solvent is greater than 0% to about 50% of mass flow rate of the liquid or fluid carbon dioxide elution solvent.

In some embodiments the co-solvent is greater than 0% to about 50% of mass flow rate of the liquid or fluid carbon dioxide elution solvent.

In some embodiments the co-solvent is greater than 0% to about 40% of mass flow rate of the liquid or fluid carbon dioxide elution solvent.

In some embodiments the co-solvent is greater than 0% to about 30% of mass flow rate of the liquid or fluid carbon dioxide elution solvent.

In some embodiments the co-solvent is greater than 0% to about 20% of mass flow rate of the liquid or fluid carbon dioxide elution solvent.

In some embodiments the source material is any one or more of a liquid, a wax, an oil, a solid.

In some embodiments the source material is an extract of an animal, plant or synthetic source material.

In an embodiment the source material is an extract of a fungus, plant seed, plant fruit, plant root, plant stem and/or leaf, algae, fish.

In some embodiments the source material is crude cannabis extract. In some embodiments the crude cannabis extract is winterised or non-winterised.

In an embodiment the source material is in a binding solvent when it is brought into contact with the MIP.

In an embodiment the binding solvent is selected from any one or more of liquid or fluid carbon dioxide, water, ethanol, methanol, ethyl acetate, isopropyl alcohol, acetonitrile, acetone, THF.

In an embodiment the binding solvent comprises liquid or fluid carbon dioxide at a density of about 0.1 to 1.2 g/cm³. In an embodiment the binding solvent comprises liquid or fluid carbon dioxide at a density of about 0.1 to 0.8 g/cm³. In an embodiment the binding solvent comprises liquid or fluid carbon dioxide at a density of about 0.2 to 0.7 g/cm³. In an embodiment the binding solvent comprises liquid or fluid carbon dioxide at a density of about 0.3 to 0.6 g/cm³. In some embodiments the binding solvent comprises liquid or fluid carbon dioxide at a density of about 0.01 to 1.3 g/cm³. In an embodiment the binding solvent comprises liquid or fluid carbon dioxide at a density of about 0.3 to 1.0 g/cm³. In an embodiment the binding solvent comprises liquid or fluid carbon dioxide at a density of about 0.8 to 1.0 g/cm³.

In an embodiment the binding solvent comprises supercritical carbon dioxide. In an embodiment the binding solvent comprises supercritical carbon dioxide at a density of about 0.1 to 1.2 g/cm$^3$. In an embodiment the binding solvent comprises supercritical carbon dioxide at a density of about 0.1 to 1.0 g/cm$^3$. In an embodiment the binding solvent comprises supercritical carbon dioxide at a density of about 0.2 to 0.7 g/cm$^3$.

In an embodiment the binding solvent comprises subcritical carbon dioxide. In an embodiment the binding solvent comprises subcritical carbon dioxide at a density of about 0.01 to 1.3 g/cm$^3$. In an embodiment the binding solvent comprises subcritical carbon dioxide at a density of about 0.4 to 1.0 g/cm$^3$. In an embodiment the binding solvent comprises subcritical carbon dioxide at a density of 0.8 to 1.0 g/cm$^3$.

In an embodiment the binding solvent comprises liquid or fluid carbon dioxide at a density that is lower than the density of the liquid or fluid carbon dioxide used as the elution solvent.

In an embodiment the binding solvent comprises liquid or fluid carbon dioxide at a pressure of about 7.4 MPa to 100 MPa and temperature of about 31° C. to 120° C. In an embodiment the binding solvent is comprises liquid or fluid carbon dioxide at a pressure of about 8 to 13 MPa and temperature of about 37 to 63° C. In an embodiment the binding solvent is comprises liquid or fluid carbon dioxide at a pressure of about 9 to 12 MPa and temperature of about 37 to 55° C.

In an embodiment the binding solvent comprises liquid or fluid carbon dioxide at a pressure of about 0.5 MPa to 41 MPa and temperature of about −50° C. to 30° C. In an embodiment the binding solvent is comprises liquid or fluid carbon dioxide at a pressure of about 3 MPa to 20 MPa and temperature of about −25° C. to 20° C. In an embodiment the binding solvent is comprises liquid or fluid carbon dioxide at a pressure of about 5 MPa to 10 MPa and temperature of about 0° C. to 13° C.

In an embodiment the binding solvent comprises liquid or fluid carbon dioxide and a co-solvent.

In some embodiments the co-solvent is selected from one or more of water, ethanol, methanol, ethyl acetate, isopropyl alcohol, acetonitrile, acetone, THF.

In some embodiments the co-solvent is greater than 0% to about 75% of mass flow rate of the liquid or fluid carbon dioxide.

In some embodiments the co-solvent is greater than 0% to about 70% of mass flow rate of the liquid or fluid carbon dioxide.

In some embodiments the co-solvent is greater than 0% to about 60% of mass flow rate of the liquid or fluid carbon dioxide.

In some embodiments the co-solvent is greater than 0% to about 50% of mass flow rate of the liquid or fluid carbon dioxide.

In some embodiments the binding solvent flows at a flow rate of about 0 to 150 column volumes per hour, or about 0.05 to 150 column volumes per hour, or about 0.05 to 100 column volumes per hour, or about 0.05 to 80 column volumes per hour, or about 0.05 to 50 column volumes per hour, or about 0.5 to 10 column volumes per hour.

In some embodiments the binding solvent is supercritical carbon dioxide and flows at a flow rate of about 0.1 to 150 column volumes per hour, or about 0.1 to 150 column volumes per hour, or about 0.1 to 100 column volumes per hour, or about 0.1 to 80 column volumes per hour, or about 0.1 to 50 column volumes per hour, or about 0.5 to 10 column volumes per hour.

In some embodiments the binding solvent is subcritical carbon dioxide and flows at a flow rate of about 0.1 to 150 column volumes per hour, or about 0.1 to 150 column volumes per hour, or about 0.1 to 100 column volumes per hour, or about 0.1 to 80 column volumes per hour, or about 0.1 to 50 column volumes per hour, or about 0.5 to 10 column volumes per hour.

In some embodiments the binding solvent comprises ethanol and flows at a flow rate of about 0 to 75 column volumes per hour, or about 0 to 50 column volumes per hour, or about 0 to 30 column volumes per hour, or about 0 to 20 column volumes per hour, or about 0.05 to 10 column volumes per hour.

In some embodiments the binding solvent comprises ethanol with a co-solvent and flows at a flow rate of about 0 to 75 column volumes per hour, or about 0 to 50 column volumes per hour, or about 0 to 30 column volumes per hour, or about 0 to 20 column volumes per hour, or about 0.05 to 10 column volumes per hour.

In some embodiments the source material is solubilised in at least one solvent prior to being brought into contact with the MIP.

In some embodiments the source material is solubilised in one or more of water, ethanol, methanol, ethyl acetate, isopropyl alcohol, acetonitrile, acetone, tetrahydrofuran (THF), liquid or fluid carbon dioxide.

In some embodiments the source material is solubilised in liquid or fluid carbon dioxide and at least one co-solvent.

In some embodiments the co-solvent is selected from one or more of water, ethanol, methanol, ethyl acetate, isopropyl alcohol, acetonitrile, acetone, THF.

In some embodiments the system comprises at least one device for providing a flow of co-solvent and means to combine the co-solvent with the flow of carbon dioxide.

In some embodiments the solubilised source material is processed prior to bringing the source material into contact with the molecularly imprinted polymer (MIP).

In some embodiments the processing comprises any one or more of filtering, warming, cooling, winterizing, sonicating (for example ultrasonicating), mixing (for example high shear mixing).

In some embodiments the source material is solubilised liquid or fluid in carbon dioxide at a density of about 0.4 to 1.0 g/cm$^3$. In some embodiments the source material is solubilised in liquid or fluid carbon dioxide at a density of about 0.6 g/cm$^3$ to 1.0 g/cm$^3$. In some embodiments the source material is solubilised in liquid or fluid carbon dioxide at a density of about 0.7 g/cm$^3$ to 1.0 g/cm$^3$. In some embodiments the source material is solubilised in liquid or fluid carbon dioxide at a density of about 0.8 to 1.0 g/cm$^3$. In some embodiments the source material is solubilised in liquid or fluid carbon dioxide at a density of about 0.8 to 0.9 g/cm$^3$. In some embodiments the source material is solubilised in liquid or fluid carbon dioxide at a density of about 0.01 to 1.3 g/cm$^3$. In some embodiments the source material is solubilised in liquid or fluid carbon dioxide at a density of about 0.3 to 1.0 g/cm$^3$. In some embodiments the source material is solubilised in liquid or fluid carbon dioxide at a density of about 0.7 to 1.0 g/cm$^3$.

In some embodiments the source material is solubilised in supercritical carbon dioxide. In some embodiments the source material is solubilised in carbon dioxide at a pressure of 7.4 MPa to 35 MPa and temperature of about 31° C. to 80° C. In some embodiments the source material is solubilised in carbon dioxide at a pressure of about 20 to 35 MPa and a temperature of about 31 to 50° C. In some embodiments the source material is solubilised in carbon dioxide at a pressure of about 25 to 35 MPa and a temperature of about 35 to 50° C.

In an embodiment the source material is solubilised in supercritical carbon dioxide with a density of about 0.4 to 1.0 $g/cm^3$. In an embodiment the source material is solubilised in supercritical carbon dioxide with a density of about 0.6 to 1.0 $g/cm^3$. In an embodiment the source material is solubilised in supercritical carbon dioxide with a density of about 0.7 to 1.0 $g/cm^3$. In an embodiment the source material is solubilised in supercritical carbon dioxide with a density of about 0.8 to 1.0 $g/cm^3$. In an embodiment the source material is solubilised in supercritical carbon dioxide with a density of about 0.8 to 0.9 $g/cm^3$.

In an embodiment the source material is solubilised in subcritical carbon dioxide. In an embodiment the source material is solubilised in carbon dioxide at a pressure of about 0.5 MPa to 41 MPa and temperature of about –50° C. to 30° C. In an embodiment the source material is solubilised in carbon dioxide at a pressure of about 5 MPa to 30 MPa and a temperature of about –10° C. to 25° C. In an embodiment the source material is solubilised in carbon dioxide at a pressure of about 7 MPa to 15 MPa and a temperature of about 10° C. to 25° C.

In an embodiment the source material is solubilised in subcritical carbon dioxide with a density of about 0.01 to 1.3 $g/cm^3$. In an embodiment the source material is solubilised in subcritical carbon dioxide with a density of about 0.3 to 1.0 $g/cm^3$. In an embodiment the source material is solubilised in subcritical carbon dioxide with a density of about 0.7 to 1.0 $g/cm^3$.

In some embodiments the source material is solubilised in liquid or fluid in carbon dioxide with a higher density than the liquid or fluid carbon dioxide used as the binding solvent.

In an embodiment the source material is solubilised in the carbon dioxide by extracting the source material from a solid material using supercritical carbon dioxide at pressure of about 20 to 35 MPa and temperature of about 30 to 50° C.

In some embodiments the source material is solubilised as the source material is extracted from solid material.

In some embodiments the solvent solubilising the source material flows at a flow rate of about 0 to 150 column volumes per hour, or over 0 to about 150 column volumes per hour, or about 0.1 to 100 column volumes per hour, or about 0.1 to 50 column volumes per hour, or about 0.5 to 20 column volumes per hour, or about 1 to 10 column volumes per hour.

In some embodiments the liquid or fluid carbon dioxide solubilising the source material flows at a flow rate of about 0.1 to 150 column volumes per hour, or about 0.5 to 50 column volumes per hour, or about 0.5 to 20 column volumes per hour, or about 1 to 10 column volumes per hour.

In some embodiments the solvent solubilising the source material comprises ethanol and flows at a flow rate of 0 to 75 column volumes per hour, or about 0 to 50 column volumes per hour, or about 0 to 30 column volumes per hour, or about 0 to 20 column volumes per hour, or about 0.05 to 10 column volumes per hour, or about 0.05 to 2 column volumes per hour.

In some embodiments the solvent solubilising the source material comprises ethanol with a co-solvent and flows at a flow rate of 0 to 75 column volumes per hour, or about 0 to 50 column volumes per hour, or about 0 to 30 column volumes per hour, or about 0 to 20 column volumes per hour, or about 0.05 to 10 column volumes per hour, or about 0.05 to 2 column volumes per hour.

In some embodiments the method further comprises a rinse step comprising rinsing the MIP with a rinse solvent to reduce fouling of the MIP from the source material, wherein the rinse step is after step a) and prior to step b).

In some embodiments the rinse solvent is selected from one or more of water ethanol, liquid or fluid carbon dioxide, methanol, ethyl acetate, isopropyl alcohol, acetonitrile, acetone, THF.

In some embodiments the rinse solvent is ethanol and water. In some embodiments the rinse solvent is about 10-30% ethanol and about 70-90% water by volume. In some embodiments the rinse solvent is 20% ethanol and 80% water by volume.

In some embodiments the rinse solvent is liquid or fluid carbon dioxide.

In some embodiments the method further comprises the step of purging the MIP to remove/reduce residue rinse solvent from the MIP and/or vessel the MIP are contained in.

In some embodiments the purge step comprises passing low pressure compressed $CO_2$ over the MIP following the rinse step.

In some embodiments the low pressure compressed $CO_2$ has a pressure of about 10-20 psi.

In some embodiments the molecularly imprinted polymer (MIP) is a cross-linked polyester resin.

In some embodiments the molecularly imprinted polymer (MIP) is a non-covalently imprinted molecularly imprinted polymer, or a covalently imprinted molecularly imprinted polymer.

In some embodiments the molecularly imprinted polymer (MIP) is a molecular recognition polymer.

In some embodiments the molecularly imprinted polymer (MIP) non-covalently associates with the target molecule.

In some embodiments the molecularly imprinted polymer has been prepared from one or more polymerizable monomers.

In some embodiments the one or more polymerizable monomer are selected from an acrylate or a vinyl.

In some embodiments the acrylate monomer is a methacryl monomer.

In some embodiments the vinyl monomer is selected from a styryl or vinylpyridine.

In some embodiments the imprinted polymer is in the form of a bead.

In some embodiments the bead is about 0.1 to 10 mm in diameter. In some embodiments the bead is about 0.2 to 8 mm in diameter. In some embodiments the bead is about 0.2 to 6 mm in diameter. In some embodiments the bead is about 0.2 to 5 mm in diameter. In some embodiments the bead is about 0.2 to 6 mm in diameter. In some embodiments the bead is about 0.2 to 4 mm in diameter. In some embodiments the bead is about 0.2 to 3 mm in diameter. In some embodiments the bead is about 0.2 to 2 mm in diameter. In some embodiments the bead is about 0.5-2 mm diameter. In some embodiments the bead is about 0.5 to 1.5 mm in diameter.

In some embodiments about 99% of the beads are about 0.1 to 10 mm in diameter. In some embodiments about 95% of the beads are about 0.1 to 10 mm in diameter. In some embodiments about 90% of the beads are about 0.1 to 10 mm in diameter. In some embodiments about 85% of the beads are about 0.1 to 10 mm in diameter.

In some embodiments the bead has compression strength of about 300-13,800 psi.

Any of the aforementioned features or embodiments or aspects may be combined with one or more of the other features or embodiments or aspects as described herein.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The disclosure consists in the foregoing and also envisages constructions of which the following gives examples only. Features disclosed herein may be combined into new embodiments of compatible components addressing the same or related inventive concepts.

BRIEF DESCRIPTION OF THE FIGURES

Preferred embodiments of the disclosure will be described by way of example only and with reference to the following drawings.

DETAILED DESCRIPTION

Figure 1:
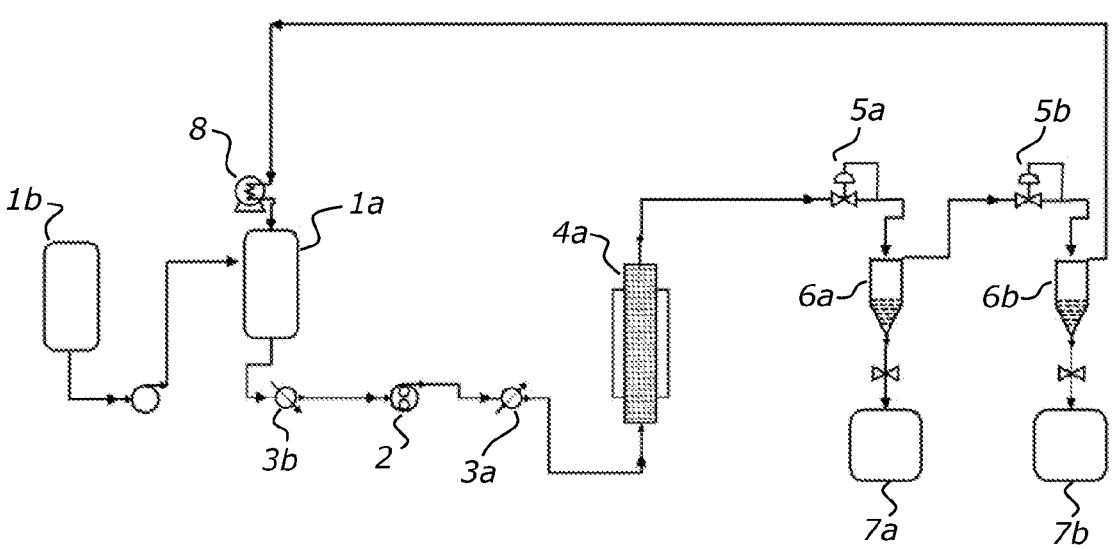
FIG. 1 shows a $CO_2$ extraction system and/or method.

The present disclosure broadly relates to a method/system for associating at least one target molecule with a molecularly imprinted polymer.

The present disclosure relates a method for associating at least one target molecule with a molecularly imprinted polymer, the method comprising: i) solubilising a source material in liquid or fluid carbon dioxide, and ii) bringing the solubilised source material in the liquid or fluid carbon dioxide into contact with a molecularly imprinted polymer (MIP) to associate at least one target molecule present in the source material with the molecularly imprinted polymer. The liquid or fluid carbon dioxide is at a first pressure and temperature combination when solubilising the source material and at a second pressure and temperature combination when bringing the solubilised source material into contact with the molecularly imprinted polymer (MIP).

The present disclosure further or alternatively relates to a system for associating at least one target molecule with a molecularly imprinted polymer, the system comprising: a molecularly imprinted polymer, at least one device for providing a flow of liquid or fluid carbon dioxide at a first pressure and temperature combination and a second pressure and temperature combination. The system is adapted to solubilise a source material in the liquid or fluid carbon dioxide and bring the solubilised source material into contact with a molecularly imprinted polymer to associate at least one target molecule present in the source material with the molecularly imprinted polymer. The liquid or fluid carbon dioxide is at the first pressure and temperature combination when solubilising the source material and at the second pressure and temperature combination when bringing the solubilised source material into contact with the molecularly imprinted polymer (MIP).

The present disclosure further or alternatively relates to a method for associating at least one target molecule with a molecularly imprinted polymer, the method comprising: i) solubilising a source material in liquid or fluid carbon dioxide and ii) bringing the solubilised source material in liquid or fluid carbon dioxide into contact with a molecularly imprinted polymer (MIP) to associate at least one target molecule present in the source material with the molecularly imprinted polymer. The liquid or fluid carbon dioxide is at a first density when solubilising the source material and at a second density when bringing the solubilised source material into contact with a molecularly imprinted polymer (MIP). The first density is different to the second density.

The present disclosure further or alternatively relates to a system for associating at least one target molecule with a molecularly imprinted polymer, the system comprising: a molecularly imprinted polymer (MIP), at least one device for providing a flow of liquid or fluid carbon dioxide at a first density and a second density, wherein the system is adapted to solubilise a source material in the liquid or fluid carbon dioxide, and bring the solubilised source material into contact with a molecularly imprinted polymer to associate at least one target molecule present in the source material with the molecularly imprinted polymer. The liquid or fluid carbon dioxide is at the first density when solubilising the source material and at the second density when bringing the solubilised source material into contact with the molecularly imprinted polymer (MIP). The first density is different to the second density.

The present disclosure further or alternatively relates to a method for associating at least one target molecule with a molecularly imprinted polymer, the method comprising: i) solubilising a source material in liquid or fluid carbon dioxide and ii) bringing the solubilised source material in liquid or fluid carbon dioxide into contact with a molecularly imprinted polymer (MIP) to associate at least one target molecule present in the source material with the molecularly imprinted polymer. The liquid or fluid carbon dioxide is at a first density when solubilising the source material and at a second density when bringing the solubilised source material into contact with a molecularly imprinted polymer (MIP). The first density is higher than the second density.

The present disclosure further or alternatively relates to a system for associating at least one target molecule with a molecularly imprinted polymer, the system comprising: a molecularly imprinted polymer (MIP), at least one device for providing a flow of liquid or fluid carbon dioxide at a first density and a second density. The system is adapted to solubilise a source material in the liquid or fluid carbon dioxide and bring the solubilised source material into contact with a molecularly imprinted polymer to associate at least one target molecule present in the source material with the molecularly imprinted polymer. The liquid or fluid carbon dioxide is at the first density when solubilising the source material and at the second density when bringing the solubilised source material into contact with the molecularly imprinted polymer (MIP). The first density is higher than the second density.

The present disclosure further or alternatively relates to a method of obtaining at least one target molecule from a source material, the method comprising: a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent. The liquid or fluid carbon dioxide used as an elution solvent is at a pressure of above about 7 MPa and a temperature of above about 31° C., or the liquid or fluid carbon dioxide used as an elution solvent is a pressure of about 0.5 to 41 MPa and a temperature of about −50 to 30° C.

The present disclosure further or alternatively relates to a system for obtaining at least one target molecule from a source material, the system comprising: a molecularly imprinted polymer, a device for providing a flow of liquid or fluid carbon dioxide. The system is adapted to bring a source material into contact with a molecularly imprinted polymer to associate at least one target molecule present in the source material with the molecularly imprinted polymer, and the system is adapted to elute the target molecule that is associated with the molecularly imprinted polymer using the flow of liquid or fluid carbon dioxide as an elution solvent. The carbon dioxide is at a pressure of above about 7 MPa and temperature of above about 31° C., or the carbon dioxide is at a pressure of about 0.5 to 41 MPa and a temperature of about −50 to 30° C.

The present disclosure further or alternatively relates to a method of obtaining a at least one target molecule from a source material, the method comprising: a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent. The liquid or fluid carbon dioxide used as an elution solvent is a pressure of above about 7 MPa and temperature above about 30° C., preferably a pressure of about 20 to 35 MPa and a temperature of about 40 to 70° C.

The present disclosure further or alternatively relates to a system for obtaining at least one target molecule from a source material, the system comprising: a molecularly imprinted polymer and a device for providing a flow of liquid or fluid carbon dioxide. The system is adapted to bring a source material into contact with a molecularly imprinted polymer to associate at least one target molecule present in the source material with the molecularly imprinted polymer. The system is adapted to elute the target molecule that is associated with the molecularly imprinted polymer using the flow of liquid or fluid carbon dioxide, and wherein the carbon dioxide is at a pressure of above about 7 MPa and temperature above about 30° C., preferably a pressure of about 20 to 35 MPa and temperature of about 40 to 70° C.

The present disclosure further or alternatively relates to a method of obtaining at least one target molecule from a source material, the method comprising: a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent. The liquid or fluid carbon dioxide used as an elution solvent is a pressure of about 0.5 to 41 MPa and a temperature of about −50 to 30° C.

The present disclosure further or alternatively relates to a system for obtaining at least one target molecule from a source material, the system comprising: a molecularly imprinted polymer, a device for providing a flow of liquid or fluid carbon dioxide. The system is adapted to bring a source material into contact with a molecularly imprinted polymer to associate at least one target molecule present in the source material with the molecularly imprinted polymer. The system is adapted to elute the target molecule that is associated with the molecularly imprinted polymer using the flow of liquid or fluid carbon dioxide as an elution solvent. The carbon dioxide is at a pressure of about 0.5 to 41 MPa and a temperature of about −50 to 30° C.

The present disclosure further or alternatively relates to a method of obtaining at least one target molecule from a source material, the method comprising: a) bringing a source material into contact with a molecularly imprinted polymer (MIP) to associate at least one target molecule present in the source material with the molecularly imprinted polymer, and b) eluting the at least one target molecule off the MIP using liquid or fluid carbon dioxide as an elution solvent. The liquid or fluid carbon dioxide used as an elution solvent has a density of about 0.2 to 1.0 $g/cm^3$, preferably a density of about 0.6 to 1.0 $g/cm^3$.

The present disclosure further or alternatively relates to a system for obtaining at least one target molecule from a source material, the system comprising: a molecularly imprinted polymer, a device for providing a flow of liquid or fluid carbon dioxide. The system is adapted to bring a source material into contact with a molecularly imprinted polymer to associate at least one target molecule present in the source material with the molecularly imprinted polymer. The system is adapted to elute the target molecule that is associated with the molecularly imprinted polymer using the flow of liquid or fluid carbon dioxide, wherein the carbon dioxide has a density of about 0.2 to 1.0 $g/cm^3$, preferably a density of about 0.6 to 1.0 $g/cm^3$.

The present disclosure further or alternatively relates to a method of obtaining at least one target molecule from a source material, the method comprising: a) bringing a source material into contact with a molecularly imprinted polymer (MIP) to associate at least one target molecule present in the source material with the molecularly imprinted polymer, b) eluting the at least one target molecule off the MIP using liquid or fluid carbon dioxide as an elution solvent. The liquid or fluid carbon dioxide used as an elution solvent has a density of about 0.01 to 1.3 $g/cm^3$.

The present disclosure further or alternatively relates to a system for obtaining at least one target molecule from a source material, the system comprising: a molecularly imprinted polymer, a device for providing a flow of liquid or fluid carbon dioxide. The system is adapted to bring a source material into contact with a molecularly imprinted polymer to associate at least one target molecule present in the source material with the molecularly imprinted polymer. The system is adapted to elute the target molecule that is associated with the molecularly imprinted polymer using the flow of liquid or fluid carbon dioxide as an elution solvent, wherein the carbon dioxide has a density of about 0.01 to 1.3 $g/cm^3$.

The methods and/or systems described herein are generally concerned with separating or purifying one or more target molecules form a source material using a molecularly imprinted polymer (MIP).

The source material may be solubilizing in order to get it into form/solution or suspension to be introduced to the MIP. The source material may be solubilized in a solvent/liquid, for example in one or more of water, ethanol, methanol, ethyl acetate, isopropyl alcohol, acetonitrile, acetone, tetrahydrofuran (THF), liquid or fluid carbon dioxide.

Where liquid or fluid carbon dioxide is used to solubilize, it may be super or sub-critical carbon dioxide, for example supercritical carbon dioxide at a pressure of about 7.4 MPa to 35 MPa and temperature of about 31° C. to 80° C. or subcritical carbon dioxide at a pressure of about 0.5 MPa to 41 MPa and temperature of about –50° C. to 30° C. The density of the liquid or fluid carbon dioxide may be about 0.4 to 1.0 $g/cm^3$ or about 0.01 to 1.3 $g/cm^3$. Where the liquid or fluid carbon dioxide is supercritical carbon dioxide the density may be about 0.4 to 1.0 $g/cm^3$ or about 0.6 to 1.0 $g/cm^3$ or about 0.7 to 1.0 $g/cm^3$ or about 0.8 to 1.0 $g/cm^3$ or about 0.8 to 0.9 $g/cm^3$. Where the liquid or fluid carbon dioxide is subcritical carbon dioxide the density may be about 0.01 to 1.3 $g/cm^3$, or about 0.3 to 1.0 $g/cm^3$, or about 0.7 to 1.0 $g/cm^3$.

Where liquid or fluid carbon dioxide is used to solubilize a co-solvent may also be used (for example one or more of water, ethanol, methanol, ethyl acetate, isopropyl alcohol, acetonitrile, acetone, THF).

In some cases, solubilizing encompasses extracting the target molecule from animal or plant material, for example, liquid, a wax, an oil, or a solid. Examples of solid material are a fungus, plant seed, plant fruit, plant root, plant stem and/or leaf, algae, fish. Examples of source material include coffee beans, kava plant, cannabis plant, mushroom, kiwi fruit, avocado, hops, tobacco, tea, grapes, blackcurrant, any one of which being whole or parts of.

In other cases, the source material to be solubilized may be partially processed, for example a crude extract, such as crude cannabis extract, which is winterized or non-winterized.

Winterization is a process used to reduce fats/waxes/other lipids in an extract. Winterization involves dissolving the extract in solvent, then chilling for around 24-48 hours to solidify the fats/waxes/other lipids, which are then filtered off. The solvent is then usually removed from the remaining extract which is depleted in the fats/waxes/other lipids. The extract/solubilised material used may be a winterised extract. However it may not be necessary to remove the solvent from the extract after the solution is winterised. The source material may be solubilised in at least one solvent prior to being brought into contact with the MIP, for example the solvent may be one or more of water, ethanol, methanol, ethyl acetate, isopropyl alcohol, acetonitrile, acetone, THF, preferably ethanol or methanol. The solubilised source material may be filtered, warmed, cooled (for example partial winterized), winterized, sonicated (for example ultra-sonicated) and/or mixed (for example high shear mixing) prior to being brought into contact with the MIP. For example, the solubilised source material may be cooled and filtered (i.e. winterised) to remove solidified fats/waxes/other lipids. The solubilised source material may then be brought into contact with a MIP to associate at least one target molecule present in the source material with the MIP. The solvent may not be removed from the source material or only partially removed from the source material. This may avoid processing steps usually associated with the winterisation process or other filtering steps and/or reduce use of solvents.

The source material (which may be solubilized first) is brought into contact with a molecularly imprinted polymer (MIP) to associate at least one target molecule present in the source material with the molecularly imprinted polymer. This may be alternatively referred to as "binding" or the "binding step". The source material may be in a binding solvent when it is brought into contact with the MIP. The binding solvent may be selected from any one or more of liquid or fluid carbon dioxide, water, ethanol, methanol, ethyl acetate, isopropyl alcohol, acetonitrile, acetone, THF. Where a liquid or fluid carbon dioxide is used it may be supercritical carbon dioxide or subcritical carbon dioxide. The liquid or fluid carbon dioxide may be at pressure and temperature combination of about 7.4 MPa to 100 MPa and about 31° C. to 120° C. or about 0.5 MPa to 41 MPa and about –50° C. to 30° C. The density of the liquid or fluid carbon dioxide used for binding may be about 0.1 to 1.2 $g/cm^3$ or about 0.01 to 1.3 $g/cm^3$.

Where the liquid or fluid carbon dioxide used for binding is supercritical carbon dioxide the density may be about 0.1 to 1.2 $g/cm^3$, or about 0.1 to 1.0 $g/cm^3$ or about 0.2 to 0.7 $g/cm^3$ and/or at pressure and temperature combination of about 7.4 MPa to 100 MPa and about 31° C. to 120° C., about 8 to 13 MPa and about 37 to 63° C., or about 9 to 12 MPa and about 37 to 55° C.

Where the liquid or fluid carbon dioxide used for binding is subcritical carbon dioxide, the density may be about 0.01 to 1.3 $g/cm^3$ or about 0.4 to 1.0 $g/cm^3$ or about 0.8 to 1.0 $g/cm^3$ and/or at a pressure and temperature combination of about 0.5 MPa to 41 MPa and about –50° C. to 30° C., or about 3 MPa to 20 MPa and about –25° C. to 20° C., or about 5 MPa to 10 MPa and temperature of about 0° C. to 13° C.

The binding solvent may comprise liquid or fluid carbon dioxide and a co-solvent, for example one or more of water, ethanol, methanol, ethyl acetate, isopropyl alcohol, acetonitrile, acetone, THF.

The co-solvent may have a flow rate of greater than 0% (for example 0.001%) to about 75% of mass flow rate of the liquid or fluid carbon dioxide, or greater than 0% to about 70%, or greater than 0% to about 60% or greater than 0% to about 50% of mass flow rate of the liquid or fluid carbon dioxide.

Where liquid or fluid carbon dioxide is used for both solubilizing the source material and binding to the MIP, the pressure and temperature combination of the carbon dioxide for the two steps may be different, and/or the density may be different, and/or the density of the liquid or fluid carbon dioxide is higher for solubilizing than binding.

The binding solvent containing the target molecule may be cycled over/through the MIP multiple times to allow more of the target molecule to bind to the MIP. i.e. the binding solvent may be collected after it has passed over/ thought the MIP and reintroduced to the MIP to contact the MIP again.

The MIP may non-covalently associate with the target molecule, while the non-target, waste, or impurities wash over or through the MIP, either with the binding solvent, or with an optionally additional rinse or wash step. The target molecule is eluted off the MIP using liquid or fluid carbon dioxide as an elution solvent.

The liquid or fluid carbon dioxide used as an elution solvent may be at a pressure of above about 7 MPa and a temperature of above about 31° C., or a pressure of about 0.5 to 41 MPa and a temperature of about −50 to 30° C. Alternatively, the liquid or fluid carbon dioxide used as an elution solvent may have a density of about 0.2 to 1.0 g/cm$^3$, or about 0.01 to 1.3 g/cm$^3$. The liquid or fluid carbon dioxide used as an elution solvent may be supercritical carbon dioxide or subcritical carbon dioxide.

Where the liquid or fluid carbon dioxide used for elution is supercritical carbon dioxide the carbon dioxide may be at a pressure of above about 7 MPa and a temperature of above about 31° C., or pressure about 7 to 100 MPa and a temperature of about 31 to 70° C., or pressure of about 7 to 55 MPa and a temperature of about 31 to 70° C., or pressure of about 7 to 35 MPa and a temperature of about 31 to 70° C., or pressure of about 10 to 35 MPa and a temperature of about 31 to 70° C., or pressure of about 10 to 35 MPa and a temperature of about 40 to 70° C., or pressure of about 20 to 35 MPa and temperature of about 40 to 70° C., or pressure of about 25 MPa to 35 MPa and temperature of about 35° C. to 50° C. The density of the carbon dioxide may be 0.4 to 1.0 g/cm$^3$ or about 0.6 to 1.0 g/cm$^3$. or about 0.8 to 1.0 g/cm$^3$.

Where the liquid or fluid carbon dioxide used for elution is subcritical carbon dioxide the carbon dioxide may be at a pressure of about 0.5 to 41 MPa and temperature of about −50 to 30° C. or pressure of about 5 to 30 MPa and temperature of about −10 to 25° C. or pressure of about 7 to 15 MPa and temperature of about 10 to 25° C. The density of the carbon dioxide may be about 0.1 to 1.1 g/cm$^3$ or about 0.2 to 1.1 g/cm$^3$ or about 0.2 to 1.0 g/cm$^3$ or about 0.5 to 1.0 g/cm$^3$ or about 0.7 to 1.0 g/cm$^3$.

The elution solvent may include at least one co-solvent, for example one or more of water, ethanol, methanol, ethyl acetate, isopropyl alcohol, acetonitrile, acetone, THF. The co-solvent may have a flow rate of greater than 0% (for example 0.001%) to about 75% of mass flow rate of the liquid or fluid carbon dioxide elution solvent, or greater than 0% to about 70%, or greater than 0% to about 60%, or greater than 0% to about 50%, or greater than 0% to about 50%, or greater than 0% to about 40%, or greater than 0% to about 30%, or greater than 0% to about 20% of mass flow rate of the liquid or fluid carbon dioxide elution solvent. The use of less co-solvent, while still achieving good elution is particularly beneficial, as elution can use large quantities of classic (for example organic) solvents.

Various embodiments are described with reference to the Figures. Throughout the Figures and specification, the same reference numerals may be used to designate the same or similar components, and redundant descriptions thereof may be omitted.

FIG. 1 shows a CO$_2$ extraction method and/or system including optional CO$_2$ storage tank 1$a$ and/or top up tank 1$b$ (although other devices for providing a flow of liquid or fluid carbon dioxide may be used), pressure adjustment device 2 (for example a high pressure pump) and CO$_2$ temperature adjustment device 3$a$ and/or pre-cooling device 3$b$. The pre-cooling device 3$b$, CO$_2$ temperature adjustment device 3$a$, pressure adjustment device 2, are all optional and may be in a different order to that shown in FIG. 1, depending on the form in which the CO$_2$ is brought into the system.

Solid material (for example plant material) may be packed in a vessel 4$a$ for extraction, for example a jacketed extraction chamber. The supercritical or subcritical CO$_2$ may be passed through the vessel 4$a$ at set/selected pressure and temperature.

Following extraction, the CO$_2$ containing the extract (i.e. the solubilized source material) may be passed to pressure and/or temperature adjustment device 5$a$, 5$b$, where the pressure adjustment causes the source material to lose solubility in the CO$_2$, for example pressure reduction causes CO$_2$ to change into gas phase and the source material remains in the liquid phase.

The source material may then be physically separated at separator 6 and collected in collection vessel 7$a$, 7$b$, if wishing to collect the source material. Physical separation in separator 6$a$, 6$b$ may be by various means, including gravity and/or cyclone.

Pressure reduction/adjustment physical separation may be done in multiple stages, for example two sequential stages are shown in FIG. 1, with a pressure and/or temperature adjustment device 5$a$ a separator 6$a$ and collection vessel 7$a$, followed by a further pressure and/or temperature adjustment device 5$b$, further separator 6$b$ and further collection vessel 7$b$.

Following pressure adjustment/reduction/separation the CO$_2$ may be recycled by cooling and/or increasing the pressure to convert back to the liquid state at converter 8. The liquid CO$_2$ may be reused in the method/system, for example by being returned to the storage tank 1$a$.

Figure 2:
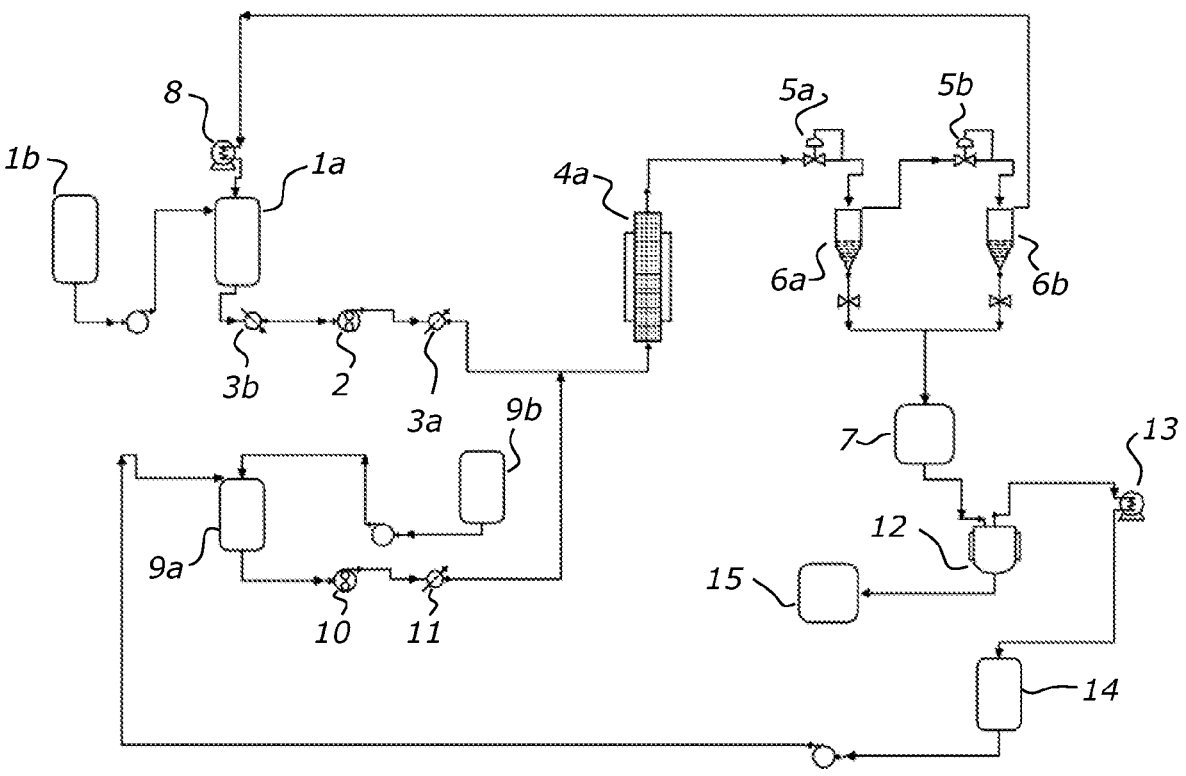
FIG. 2 shows a $CO_2$ with cosolvent extraction system and/or method.

FIG. 2 shows a CO$_2$ and co-solvent extraction method and/or system including optional CO$_2$ storage tank 1$a$ and/or top up tank 1$b$ (other devices for providing a flow of liquid or fluid carbon dioxide may be used), pressure adjustment device 2 (for example a high pressure pump) and CO$_2$ temperature adjustment device 3$a$ and/or pre-cooling device 3$b$. The pre-cooling device 3$b$, CO$_2$ temperature adjustment device 3$a$, pressure adjustment device 2, are all optional and may be in a different order to that shown in FIG. 2, depending on the form in which the CO$_2$ is brought into the system. A co-solvent storage 9$a$ and/or co-solvent top up 9$b$, co-solvent injection pump 10, and co-solvent temperature adjustment device 11 are shown, but are optional, as other devices for providing a flow of co-solvent may be used and/or temperature adjustment may not be required.

Plant material may be packed in vessel 4$a$ for extraction, for example a jacketed extraction chamber. The supercritical or subcritical CO$_2$ and co-solvent may be passed through the vessel 4$a$ at set pressure and temperature.

Following extraction, the CO$_2$ and co-solvent containing the source material is optionally passed to pressure and/or temperature adjustment device 5$a$, 5$b$, where the pressure adjustment causes the source material to lose solubility in the CO$_2$ and co-solvent, for example pressure reduction causes CO$_2$ to change into gas phase and the source material remains in the liquid phase.

The source material may be then physically separated at separator 6$a$, 6$b$ and the source material and co-solvent collected in collection vessel 7. Physical separation in separator 6$a$, 6$b$ may be by various means, including gravity and/or cyclone.

Pressure reduction/adjustment physical separation may be done in multiple stages, for example two sequential stages are shown in FIG. 2, with a pressure and/or temperature adjustment device 5$a$ a separator 6$a$ and collection vessel 7, followed by a further pressure and/or temperature adjustment device 5*b* and further separator 6*b* feeding to collection vessel 7.

The co-solvent and source material may optionally be separated at co-solvent separation unit 12, for example the source material may be collected at collection unit 15 and co-solvent may be evaporated and condensed at condensation unit 13 and may be passed to co-solvent tank 14 for recycling back to co-solvent storage 9*a*.

Following pressure adjustment/reduction/separation the $CO_2$ may also be recycled by cooling and/or increasing the pressure to convert back to the liquid state at converter 8. The liquid $CO_2$ may be reused in the method/system, for example by being returned to the storage tank 1*a*.

Figure 3:
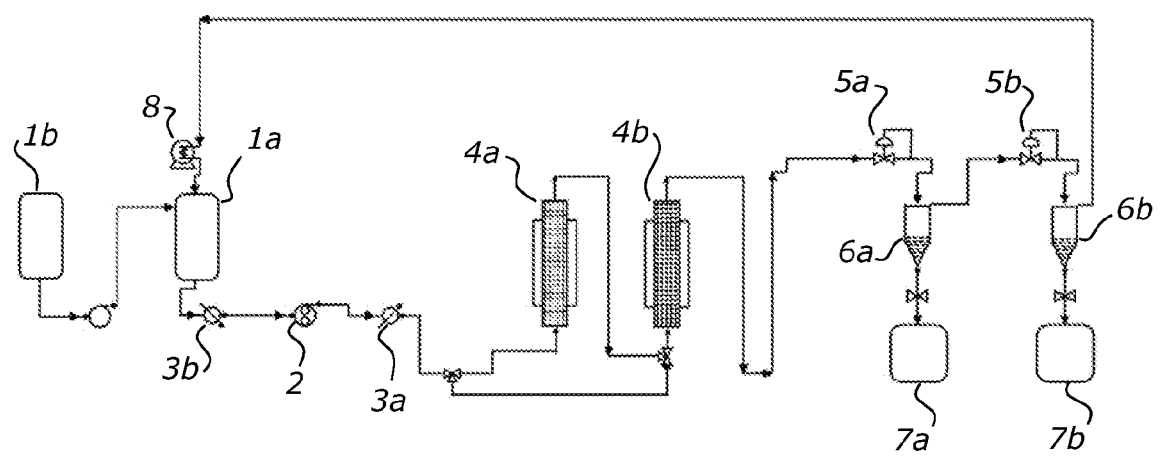
FIG. 3 shows $CO_2$ sequential extraction and binding system and/or method.

FIG. 3 shows a $CO_2$ sequential extraction (solubilising) and binding system and/or method. FIG. 3 including optional $CO_2$ storage tank and/or $CO_2$ top up tank 1*b*, $CO_2$ pressure adjustment device 2, and $CO_2$ temperature adjustment device 3*a* and/or pre-cooling device 3*b*. These were previously described in relation to FIG. 1.

Solid material (for example plant material comprising source material, e.g. plant extract) may be packed in vessel 4*a* for extraction, for example a jacketed extraction chamber. $CO_2$ may be passed through the vessel 4*a* at set pressure and temperature.

The $CO_2$ containing the source material may be passed to the MIP. In this example the MIP beads are contained in a separate vessel 4*b*. The source material may be brought into contact with the MIP (for example MIP beads), for the target molecule(s) to associate with the MIP while the remainder of the extract (that does not associate with the MIP) may be flushed through with the $CO_2$. The remainder of the extract that is flushed through may be collected and optionally may be passed to the MIP again or to another MIP (not shown), for further binding and elution.

Further $CO_2$ at a different selected pressure and temperature or density (which does not contain source material) may be passed though/over the MIP in separate vessel 4*b* via a bypass valve (bypassing vessel 4*a*) to elute the target molecule(s) from the MIP. The pressure and temperature or density may be changed sharply or gradually from the temperature/pressure/density used to bring the source material into contact with the MIP.

The target molecule(s) may be collected, for example the $CO_2$ containing the target molecule(s) may be passed to pressure and/or temperature adjustment device 5*a*, 5*b*, where the pressure adjustment causes the target molecule(s) to lose solubility in the $CO_2$. Pressure reduction causes $CO_2$ to change into gas phase and the target molecule(s) remains in the liquid phase, the target molecule(s) may be then physically separated at separator 6*a*, 6*b* and collected in collection vessel 7*a*, 7*b*.

Physical separation in separator 6*a*, 6*b* may be by various means, including gravity and/or cyclone. Pressure reduction/adjustment physical separation may be done in multiple stages, for example two sequential stages are shown in FIG. 2, with a pressure adjustment device 5*a* a separator 6*a* and collection vessel 7*a*, followed by a further pressure adjustment device 5*b*, further separator 6*b* and further collection vessel 7*b*.

Following pressure adjustment/reduction/separation the $CO_2$ may be recycled by cooling and/or increasing the pressure to convert back to the liquid state at converter 8. The liquid $CO_2$ may be reused in the method/system, for example by being returned to the storage tank.

Figure 4:
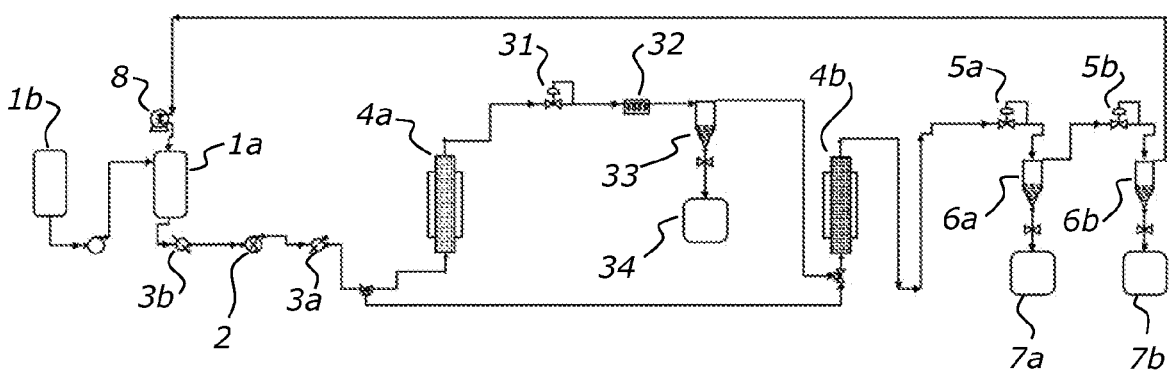
FIG. 4 shows a further $CO_2$ sequential extraction and binding system and/or method.

FIG. 4 shows a $CO_2$ sequential extraction and binding system and/or method with two vessels/columns in series 4*a* and 4*b* containing the solid material (comprising the source material) and the MIPs respectively. The system/method may include a $CO_2$ storage or top up tank(s) 1, $CO_2$ pressure adjustment device 2, and $CO_2$ temperature adjustment device 3.

Solid material (for example plant material comprising source material, e.g. plant extract) may be packed in vessel 4*a* for extraction, for example a jacketed extraction chamber.

$CO_2$ may be passed through the vessel 4*a* at set pressure and temperature. The pressure and temperature (and therefore density) of the $CO_2$ containing the source material may be adjusted using the pressure regulating device 31 and/or temperature regulating device 32. This may cause some of the solubility of some of the components extracted from the solid material to drop out of the $CO_2$ solution. These may be removed (for example by extract separator 33 and/or extract collection vessel 34) to avoid fouling of the MIP in the second vessel/column 4*b*.

The extract pressure regulating device 31 and/or extract temperature regulating device 32 optionally allow the pressure/temperature/density of the $CO_2$ to be adjusted prior to the $CO_2$ containing the source material being contacted with the MIP. The $CO_2$ containing the source material may be passed to the MIP.

In this example (see FIG. 4) the MIP is contained in a separate vessel 4*b*. The source material may be brought into contact with the MIP (for example MIP beads), for the target molecule(s) to associate with the MIP while the remainder of the extract (that does not associate with the MIP) may be flushed through with the $CO_2$. The extract that is flushed through may be collected and optionally may be passed to the MIP again or to another MIP (not shown), for further binding and elution.

$CO_2$ at a different selected pressure and temperature or density (which does not contain source material/extract) may be passed though/over the MIP in separate vessel 4*b* via a bypass valve (bypassing vessel 4*a*) to elute the target molecule(s) from the MIP. The pressure and temperature or density may be changed sharply or gradually from the temperature/pressure/density used to bring the source material into contact with the MIP.

The target molecule(s) may be collected, for example the $CO_2$ containing the target molecule(s) may be passed to pressure and/or temperature adjustment device 5*a*, 5*b*, where the pressure adjustment causes the target molecule(s) to lose solubility in the $CO_2$. Pressure reduction may cause $CO_2$ to change into gas phase and the target molecule(s) remains in the liquid phase. The target molecule(s) may be then physically separated at separator 6*a*, 6*b* and collected in collection vessel 7*a*, 7*b*. Physical separation in separator 6*a*, 6*b* may be by various means, including gravity and/or cyclone.

Pressure reduction/adjustment physical separation may be done in multiple stages, for example two sequential stages are shown in FIG. 4, with a pressure adjustment device 5*a*, a separator 6*a* and collection vessel 7*a*, followed by a further pressure adjustment device 5*b*, further separator 6*b* and further collection vessel 7*b*.

Following pressure adjustment/reduction/separation the $CO_2$ may be recycled by cooling and/or increasing the pressure to convert back to the liquid state at converter 8. The liquid $CO_2$ may be reused in the method/system, for example by being returned to the storage tank 1*a*.

Figure 5:
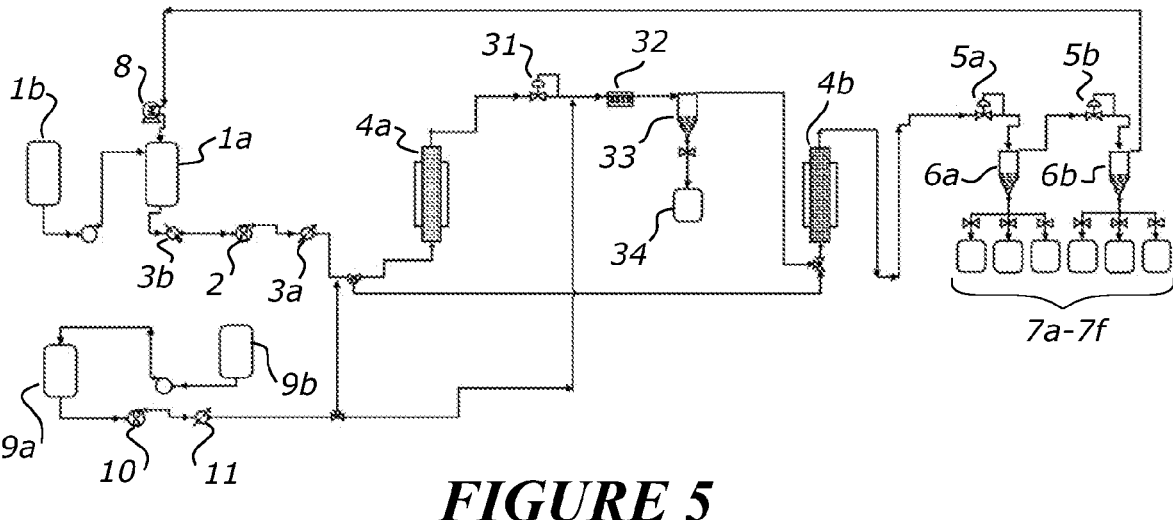
FIG. 5 shows a further $CO_2$ sequential extraction and binding system and/or method using a co-solvent.

FIG. 5 shows a $CO_2$ sequential extraction and binding system and/or method with two vessels/columns in series (4*a* and 4*b*) containing the solid material (comprising the source material) and the MIPs respectively.

The system/method allows for co-solvent to be added to the $CO_2$ stream at any one or more of (1) solubilising the source material or extraction of source material from a solid material in vessel 4a (2) when the source material in the $CO_2$ is contacted with the MIP in vessel 4b (e.g. binding) (3) when the $CO_2$ steam elutes at least one target molecule off the MIP in vessel 4b.

The system/method may include a $CO_2$ storage or top up tank(s) 1a, 1b, $CO_2$ pressure adjustment device 2, $CO_2$ temperature adjustment device 3a and/or pre-cooling device 3b as previously described in relation to FIG. 1, co-solvent provision (for example co-solvent storage tank 9a co-solvent top up 9b, co-solvent injection pump 10, and/or co-solvent pressure adjustment device and/or temperature adjustment device 11).

Solid material (for example plant material comprising source material, e.g. plant extract) may be packed in extraction vessel 4a, for example a jacketed extraction chamber.

$CO_2$ and optionally co-solvent may be passed through the extraction vessel 4a at set/selected pressure and temperature.

The pressure and temperature (and therefore density) of the $CO_2$ containing the source material may be adjusted using the pressure regulating and/or temperature regulating device(s) 31, 32. This may cause some of the solubility of some of the components extracted from the solid material to drop out of the $CO_2$ solution. These may be removed to avoid fouling of the MIP in the second vessel/column 4b (for example by extract separator 33 and/or extract collection vessel 34).

The extract pressure regulating and/or temperature regulating device(s) 31, 32 may further allow the pressure/temperature/density of the $CO_2$ to be adjusted prior to the $CO_2$ (and optionally co-solvent) containing the source material being contacted with the MIP.

The $CO_2$ (and optionally co-solvent) containing the source material may be passed to the MIP. In this example the MIP may be contained in a separate vessel 4b. The source material may be brought into contact with the MIP (for example MIP beads), for the target molecule(s) to associate with the MIP while the remainder of the extract (that does not associate with the MIP) may be flushed through with the $CO_2$ (and optionally co-solvent). The extract/$CO_2$/co-solvent that is flushed through may be collected and optionally may be passed to the MIP again or to another MIP (not shown), for further binding and elution.

Further $CO_2$ at a different selected pressure and temperature or density (which does not contain source material/extract) and optionally co-solvent may be passed though/over the MIP in separate vessel 4b via a bypass valve (bypassing vessel 4a) to elute the target molecule(s) from the MIP. The pressure and temperature or density may be changed sharply or gradually from the temperature/pressure/density used to bring the source material into contact with the MIP.

The target molecule(s) may be collected, for example the $CO_2$ (and optionally co-solvent) containing the target molecule(s) may be passed to pressure and/or temperature adjustment device 5a, 5b, where the pressure adjustment causes the target molecule(s) to lose solubility in the $CO_2$. Pressure reduction may cause $CO_2$ to change into gas phase and the target molecule(s) remains in the liquid phase, the target molecule(s) may be then physically separated at separator 6a, 6b and collected in collection vessel(s) 7 (7a-7f).

Physical separation in separator 6a, 6b may be by various means, including gravity and/or cyclone. Pressure reduction/adjustment physical separation may be done in multiple stages, for example two sequential stages are shown in FIG. 5, with a pressure and/or temperature adjustment device 5a a separator 6a and collection vessel(s) 7a, 7b, 7c, followed by a further pressure and/or temperature adjustment device 5b, further separator 6b and further collection vessel(s) 7d, 7e, 7f.

Following pressure adjustment/reduction separation the $CO_2$ may be recycled by cooling and/or increasing the pressure to convert back to the liquid state at converter 8. The liquid $CO_2$ may be reused in the method/system, for example by being returned to the storage tank 1a.

Figure 6:
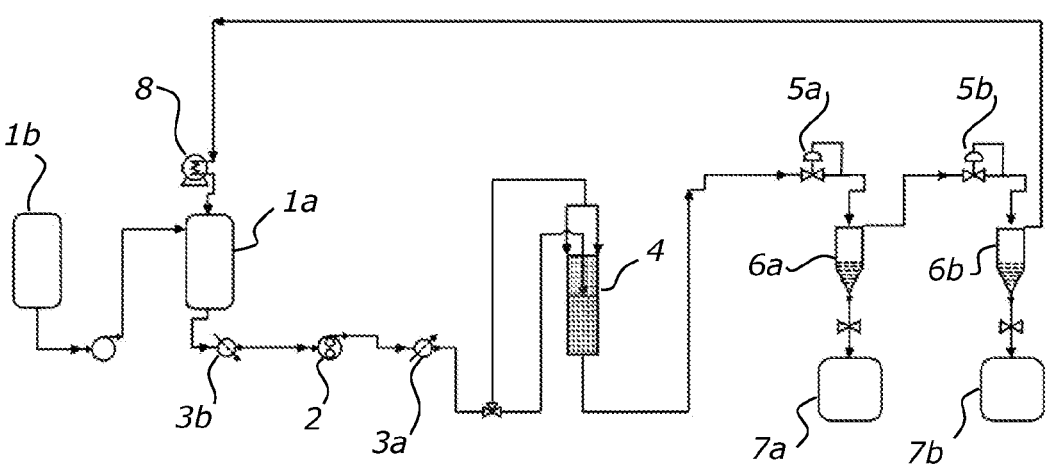
FIG. 6 shows $CO_2$ an extraction and binding system and/or method in the same vessel.

FIG. 6 shows a $CO_2$ extraction and binding system and/or method in a single vessel/column 4 containing the solid material (comprising the source material) and the MIPs. The solid material and the MIP are divided into a first portion containing the solid material and a second portion containing the MIP. The system/method including a $CO_2$ storage or top up tank(s) 1a, 1b, $CO_2$ pressure adjustment device 2, and $CO_2$ temperature adjustment device 3a and/or pre-cooling device 3b (as previously described in relation to FIGS. 1 and 2).

Solid material (for example plant material comprising source material, e.g. plant extract) may be packed in the first portion of vessel 4, for example a jacketed extraction chamber.

$CO_2$ may be passed through the first portion of vessel 4 at set pressure and temperature. The $CO_2$ containing the source material may then flow to the MIP in the second portion of vessel 4. The source material may be brought into contact with the MIP (for example MIP beads), for the target molecule(s) to associate with the MIP while the remainder of the extract (that does not associate with the MIP) may be flushed through with the $CO_2$. The extract that may be flushed through may be collected and may be passed to the MIP again or to another MIP (not shown), for further binding and elution.

Further $CO_2$ at a different selected pressure and temperature or density (which does not contain source material/extract) may be provided via a bypass valve (shown between temperature adjustment device 3a and vessel 4) and enters vessel 4 by an alternative entry and may be passed though/over the MIP in vessel 4 to elute the target molecule(s) from the MIP.

The pressure and temperature or density may be changed sharply or gradually from the temperature/pressure/density used to bring the source material into contact with the MIP.

The target molecule(s) may be collected, for example the $CO_2$ containing the $CO_2$ containing the target molecule(s) may be passed to pressure and/or temperature adjustment device 5a, 5b, where the pressure adjustment causes the target molecule(s) to lose solubility in the $CO_2$. Pressure reduction may cause $CO_2$ to change into gas phase and the target molecule(s) remains in the liquid phase, the target molecule(s) may be then physically separated at separator 6a, 6b and collected in collection vessel 7a, 7b.

Physical separation in separator 6a, 6b may be by various means, including gravity and/or cyclone. Pressure reduction/adjustment physical separation may be done in multiple stages, for example two sequential stages are shown in FIG. 6, with a pressure adjustment device 5a a separator 6a and collection vessel 7a, followed by a further pressure adjustment device 5b, further separator 6b and further collection vessel 7b.

Following pressure adjustment/reduction/separation the $CO_2$ may be recycled by cooling and/or increasing the pressure to convert back to the liquid state at converter 8.

The liquid $CO_2$ may be reused in the method/system, for example by being returned to the storage tank 1a.

Figure 7:
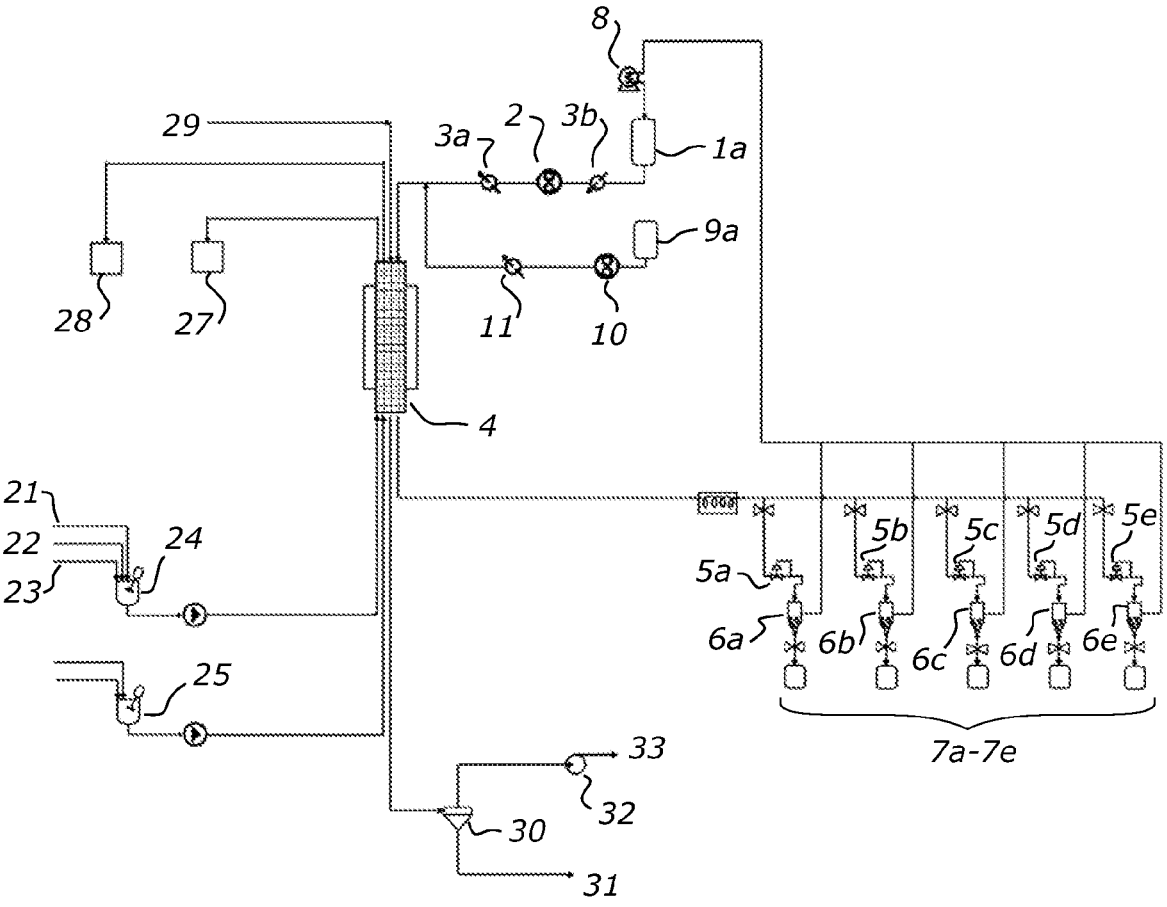
FIG. 7 shows solvent association/binding and $CO_2$ elution

FIG. 7 shows a $CO_2$ binding system and elution system and/or method. Extract/source material (for example plant extract in water/ethanol or solution containing target molecule(s)) may be fed into tank 4 via port 21 (for example from the system in FIG. 1 or 2) and if required to solubilise, ethanol, water or other solvents are provided via ports 22 and 23.

Solubilised source material may be fed from tank 24 through vessel/column 4 containing the MIP to associate the target molecule(s) with the MIP. The remaining extract may pass over the MIP to recovery tank 27. Recovery tank 27 collects the extract so that it may be passed to the MIP again or to another MIP (not shown), for further association/binding and elution.

Rinse tank 25 optionally provides rinse solvent (for example water/ethanol mix) which may be pumped through vessel 4 (over the MIP). Having passed through the MIP the rinse solvent may go to recovery tank 28 for disposal or reprocessing. A rinse may be used to wash off or reduce fouling of the MIP from the source material.

A purge (for example low pressure compressed $CO_2$) is optionally provided from purge source 29, to the vessel 4, to remove residue rinse solvent from the MIP/vessel. Excess rinse solution may pass to gas-liquid separator 30, to separate $CO_2$ and rinse solvent, the rinse solvent may be collected (for example at 31) for disposal or reprocessing.

A vacuum pump 32 is optionally provided to further remove residual rinse solution from the vessel/MIP. The $CO_2$ gas collected may be vented or collected at 33.

Once the target molecule(s) are associated (for example bound) the MIP in vessel 4, (and optionally the vessel/MIP rinsed and/or purged and/or vacuum applied and released), a flow of fluid or liquid $CO_2$ may be provided, for example from $CO_2$ tank 1a, and selected pressure and temperature (for example via pre-cooler device 3b, pump, or high pressure pump 2 and/or temperature adjustment 3a).

An elution co-solvent (for example ethanol) is optionally provided from co-solvent tank 9a. The co-solvent may be injected into the $CO_2$ flow prior to entering vessel 4. The amount/ratio of co-solvent is optionally controlled at co-solvent dosing pump 10 and/or the temperature of the co-solvent adjusted at co-solvent temperature adjuster 11.

The $CO_2$ flow pressure and/or temperature may be adjusted during elution to elute different target molecules from the MIP, thereby at least partially separating the target molecules. For example, the $CO_2$ flow may start at lower pressure and lower temperature to remove weakly associated target extract or target molecule(s). Such conditions may also or alternatively be used as an alternative to a rinse (as described above). The pressure and temperature may be increased over time and/or the amount of co-solvent changed (for example increasing ratio of ethanol). The extract and/or target molecules eluted under different conditions may be collected as fractions as they exit the vessel 4.

The fractions may be collected, for example the $CO_2$/co-solvent containing target molecule(s) may be passed to pressure and/or temperature adjustment device(s) 5a-5e, where the pressure adjustment may cause the target molecule(s) to lose solubility in the $CO_2$/co-solvent.

Pressure reduction may cause $CO_2$ to change into gas phase and the target molecule(s) remains in the liquid phase, the target molecule(s) may be then physically separated at separator(s) 6a-6e and collected in collection vessel(s) 7a-7e.

Physical separation in separator 6a-6e may be by various means, including gravity and/or cyclone. Following pressure adjustment/reduction separation the $CO_2$ may be recycled by condensing at condenser 8 to convert back to the liquid state. The liquid $CO_2$ may be reused in the method/system, for example by being returned to the storage tank 1a.

Where, in the foregoing description reference has been made to integers or components having known equivalents thereof, those integers are herein incorporated as if individually set forth.

Although the present disclosure has been described in terms of certain embodiments, other embodiments apparent to those of ordinary skill in the art also are within the scope of this disclosure. Thus, various changes and modifications may be made without departing from the spirit and scope of the disclosure. For instance, various components may be repositioned as desired. Moreover, not all of the features, aspects and advantages are necessarily required to practice the present disclosure. Accordingly, the scope of the present disclosure is intended to be defined only by the claims that follow.

EXAMPLES

1. Extraction and Binding of Cannabinoids with Carbon Dioxide

1.1 Experimental

The experiment was carried out using crude cannabis extract as the input material, with the intent of binding cannabinoids.

Cannabis plant material was dried and then ground into a fine powder, picking out large stems and sticks.

A column was packed with ⅔ dried ground plant material, then the remaining space was filled with MIP to ensure the $CO_2$ flowed into the plant material then through the MIPs (carrying the cannabinoids).

The Supercritical $CO_2$ machine was run at 40° C. at 4000 psi (27.58 MPa) for 15 mins (allowing for a heat soak to allow the vessel/column and the material inside to get to the same temperature).

The initial extraction process was 15 mins with $CO_2$ running.

For the binding process the pressure was reduced to 1500 psi (10.34 MPa) and held for 10 minutes.

The experimental parameters are given in Table 1.

TABLE 1

| Parameter | Details |
| --- | --- |
| MIP | MIP beads (templated to non-covalently bind cannabinoids as a class) Mass: 12.581 grams |
| Input Material | Cannabis leaf, no flower/bud Mass: 18.779 grams |
| Extraction from Plant | 40° C. and 4000 psi (27.6 MPa) for total of 15 mins |
| Binding to MIP | 40° C. and 1500 psi (10.3 MPa), closed system held for 10 mins |

The following time schedule was used for the experiment:

Heating as turned ON at 1.10 pm at 40° C. and was left to heat soak through the column and material.

Supercritical $CO_2$ cylinders were turned ON at 1.35 pm, the pressure got to 4000 psi at 1.40 pm Extracted with flowing $CO_2$ at 4000 psi for 15 mins (until 1.55 pm)—Collected the material that passed over the beads and exited the cylinder.

At 1.55 pm the Super Critical $CO_2$ cylinders were switched off, and the pressure reduced to 1500 psi 78.0 mg of THC (tetrahydrocannabinol) was bound to the MIP beads. The bold cells have been chosen as they are dilutions that fit in the calibration curve (whereas the other cells fall outside).

This experiment has provided initial evidence to support binding target molecules from MIPs using supercritical $CO_2$.

TABLE 2

| | | | RAW LCMS data | | RAW LCMS data to ppb conversion (using standard curve) | | Correction for dilution series Dilution Factor | | ppb to ppm conversion | | Sample Volume (L) | ppm to mg conversion | |
|---|---|---|---|---|---|---|---|---|---|---|---|---|---|
| | | | CBD | THC | CBD | THC | CBD Dilution Factor | THC | CBD | THC | | CBD | THC |
| | | | CBD | THC | CBD | THC | CBD | THC | CBD | THC | | CBD | THC |
| A | Bound | 10 | 54855264 | 51673977 | 53282 | 34365 | 532822 | 343652 | 533 | 344 | 0.13 | 69.3 | 44.7 |
| B | to | 100 | 11381913 | 8266748 | 11055 | 5517 | 1105460 | 551745 | 1105 | 552 | 0.13 | 143.7 | 71.7 |
| C | Beads | 1000 | 1482931 | 930094 | 1439 | 642 | 1439271 | 641627 | 1439 | 642 | 0.13 | 187.1 | 83.4 |
| D | | 10000 | 149270 | 101230 | 144 | 91 | 1438254 | 907769 | 1438 | 908 | 0.13 | 187.0 | 118.0 |
| E | | 10 | 55055893 | 51895499 | 53477 | 34512 | 534771 | 345124 | 535 | 345 | 0.13 | 69.5 | 44.9 |
| F | | 100 | 11339558 | 8190221 | 11013 | 5467 | 1101346 | 546659 | 1101 | 547 | 0.13 | 143.2 | 71.1 |
| G | | 1000 | 1489327 | 968771 | 1445 | 667 | 1445483 | 667331 | 1445 | 667 | 0.13 | 187.9 | 86.8 |
| H | | 10000 | 145573 | 93791 | 140 | 86 | 1402343 | 858331 | 1402 | 858 | 0.13 | 182.3 | 111.6 |
| I | Flowed | 10 | 15227827 | 19491681 | 14790 | 12977 | 147903 | 129774 | 148 | 130 | 0.005 | 0.7 | 0.6 |
| J | Past | 100 | 2376471 | 2704107 | 2307 | 1821 | 230721 | 182061 | 231 | 182 | 0.005 | 1.2 | 0.9 |
| K | Beads. | 1000 | 285430 | 301318 | 276 | 224 | 276084 | 223752 | 276 | 224 | 0.005 | 1.4 | 1.1 |
| L | | 10000 | 35056 | 26018 | 33 | 41 | 328841 | 407922 | 329 | 408 | 0.005 | 1.6 | 2.0 |
| M | | 10 | 14855672 | 19371233 | 14429 | 12897 | 144288 | 128973 | 144 | 129 | 0.005 | 0.7 | 0.6 |
| N | | 100 | 2326755 | 2590838 | 2259 | 1745 | 225892 | 174533 | 226 | 175 | 0.005 | 1.1 | 0.9 |
| O | | 1000 | 245673 | 286500 | 237 | 214 | 237466 | 213904 | 237 | 214 | 0.005 | 1.2 | 1.1 |
| P | | 10000 | 30984 | 34617 | 29 | 47 | 289288 | 465069 | 289 | 465 | 0.005 | 1.4 | 2.3 |

(while still capturing any expelled material). The bleed-off valve was closed to hold at this pressure for 10 min (until 2.05 pm).

At 2.05 pm the bleed-off valve was opened, and all remaining pressure was slowly released (while still capturing any expelled material).

1.2 Results

The results are shown in Table 2.

Each dilution was done in duplicate (for example A and E, B and F, C and G, D and H). Cells A-H give what was bound to beads within supercritical conditions Cells I-P give what flowed past the beads, and into a collection vial outside the $CO_2$ cylinder. Bold cells in the last two columns are the sample dilutions that fit within the calibration curve from the LCMS cannabinoid standards.

1.3 Discussion of Results

The approach for this experiment was to exploit the solubility of cannabinoids in supercritical $CO_2$, which increases as the density of the fluid increases.

Higher pressure, (4000 psi) was used initially to extract from the plant material and to ensure the supercritical fluid had higher amounts of cannabinoids solubilised in solution. Then during the binding process, the pressure was decreased (1500 psi) as the density decreases, the aim is for the cannabinoids to drop out of solution and find preferential binding in the MIPs.

The results in the bold cells in the last two columns, suggest an average of 186.0 mg of CBD (cannabidiol) and

2. Extraction and Binding of Cannabinoids with Carbon Dioxide

2.1 Experimental

The experiment was carried out using crude cannabis extract as the input material, with the intent of binding cannabinoids.

The crude cannabis extract was loaded into a small mesh bag, taking weights to calculate exactly how much extract was loaded.

A column was placed vertically, and glass beads poured in to make a 1-2 cm bed at the bottom of the column.

The mesh bag containing the extract was dropped in on top of the glass beads.

More glass beads were poured in to surround and cover the mesh bag by 1-2 cm.

A mesh frit was dropped in to keep glass beads separate from MIP.

MIP were loaded in to fill the rest of the column.

Figure 8:
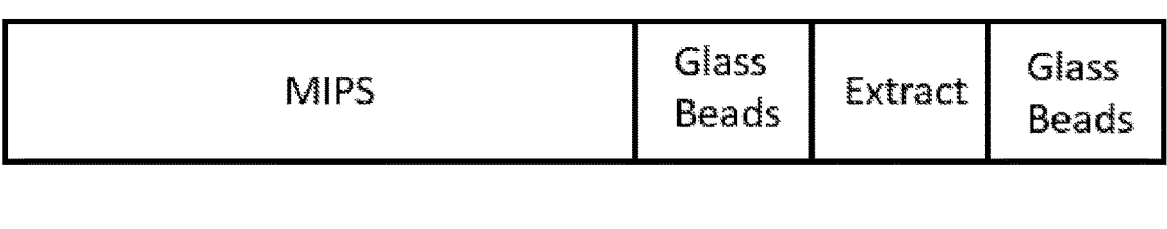
FIG. 8 shows set up of the column in Example 2.

The setup of the column is shown in FIG. 8.

The super critical $CO_2$ was started 40° C. and 4000 psi for extraction.

For the binding to the MIP the $CO_2$ was reduced to 1500 psi and leave at 40° C.

The parameters of the experiment are given in Table 3.

TABLE 3

| Parameter | Details |
|---|---|
| Input material | Crude, non-winterised cannabis extract Potency of 462.7 mg of crude |

TABLE 3-continued

| Parameter | Details |
|---|---|
| | 9.2% CBD | 1.1% THC |
| | 350 ppm CBD | 35 ppm THC |
| Equipment | Small non-commercial/benchtop scale supercritical $CO_2$ extraction machine. Range of 20° C.-65° C. and 4500 psi max., extraction chamber is ~110 cm³. Direct attachment to $CO_2$ cylinder, no flowrate control, vents directly to atmosphere. |
| MIP | Cannabinoid MIP beads (templated to non-covalently bind cannabinoids as a class) Mass: ~35 grams (est. only) |
| | Processing conditions: |
| Extraction Conditions | 40° C. and 4000 psi (27.6 MPa) |
| Binding Conditions | 40° C. and 1500 psi (10.3 MPa) |

The following time schedule was used for the experiment:

Heating was set at 40° C. and turned on at 2.15 pm, left to heat soak for 30 mins.

The $CO_2$ was turned on, and cylinders turned on at 2.45 pm to increase the pressure to 4000 psi.

The pressure got to 4000 psi by 2.47 pm and continued to hold at this pressure with $CO_2$ flowing until 3.17 pm.

The $CO_2$ was turned off at 3.17 pm, and the pressure was manually decreased to 1500 psi to hold for 15 mins.

At 3.32 pm the cylinder valve was fully opened to allow the chamber to completely depressurise.

2.2 Results

The results are shown in Table 4.

The initial extract potency was 9.2% CBD (cannabidiol) and 1.1% THC (tetrahydrocannabinol).

The captured extract potency (in the MIPs) was 12.6% CBD and 1.3% THC.

TABLE 4

| | | CO₂ flow direction → | | |
|---|---|---|---|---|
| Extract | Glass beads | Mesh holder | MIPS | Extract that passed through MIPS |
| 350 ppm CBD 35 ppm THC (initial weight before extraction and binding 462.7 mg) | 2 ppm CBD 0 ppm THC | 2 ppm CBD 0 ppm THC | 623 ppm CBD 63 PPM (522.8 mg oil recovered with rotovap) | 164 ppm CBD 4 ppm THC |

2.3 Discussion of Results

The data shows is 99.9% of the extract is solubilised and carried out from the mesh holder. It appears that the glass beads slow down/separate and hold onto the fats and waxes as the glass beads were covered in a green sticky residue, while the MIP's that bound the cannabinoids turned a more yellow colour.

The data further shows the MIP's ability to bind both CBD and THC within supercritical conditions.

Greater mass of oil/extract appeared to be recovered from the MIP's than was initially loaded into the mesh holder. This is believed to be due to added mass from a small amount of dust from the MIPs being washed off during the soxhlet wash into the ethanol that was later reduced in the rotovap and/or the margin of error with relatively small weights.

This experiment provided proof-of-concept evidence to support the ability of MIPs to bind target molecules in a supercritical $CO_2$ medium.

3. Elution with Supercritical Carbon Dioxide

3.1 Experimental

The experiment was carried out using crude cannabis extract as the input material, with the intent of eluting cannabinoids. 5 g of non-winterised crude cannabis extract was dissolved into a 50% EtOH/$H_2O$ solution. MIPs were added to the solution to bind the cannabinoids, then dried in dehydrator. The super critical $CO_2$ was run at three different conditions, with varying temperature and pressure. The parameters are given in Table 5.

TABLE 5

| Parameter | Details |
|---|---|
| Input material | Crude, Non-winterised cannabis extract Potency of 4987 mg of crude - 6.4% CBD and 2.6% THC |
| Equipment | Small non-commercial/benchtop scale supercritical $CO_2$ extraction machine. Range of 20° C.-65° C. and 4500 psi (31.0 MPa) max., extraction chamber is ~110 cm³, Direct attachment to $CO_2$ cylinder, no flowrate control, vents directly to atmosphere. |
| MIP | Cannabinoid MIP beads (templated to non-covalently bind cannabinoids as a class) Mass: ~41 grams (est. from column size) Beads bound: 99.8% THC | 99.6% CBD |

TABLE 5-continued

| Parameter | Details |
|---|---|
| | Processing Conditions |
| 40° C. & 2000 psi | First hour condition Potency of 336.1 mg of extracted oil 8.7% CBD and 2.1% THC |
| 65° C. & 1400 psi | Second hour condition Potency of 24 mg of extracted oil 18.8% CBD and 2.1% THC |
| 67° C. & 3400 psi | Third hour condition Potency of 29.5 mg of extracted oil 23.4% CBD and 2.4% THC |

TABLE 5-continued

| Parameter | Details |
| --- | --- |
| | Post-processing Steps: |
| 200 mL neat EtOH | Soxhlet wash contained 85% CBD and 40% THC |

3.2 Results

The results are shown in Table 6.

TABLE 6

| | Column Equivalent | Stock Volume | Solution ppm | | Calculated Amount of Cannabinoids (mg) | | Total Calculated Cannabinoids | Physically Weighed Amount of Extracted Oil |
| --- | --- | --- | --- | --- | --- | --- | --- | --- |
| | Condition | (mL) | CBD | THC | CBD | THC | (mg) | (mg) |
| Extract Solution - 5 g in 200 mL of 50% eth. | Matrix | 200 | 1597 | 638 | 319.3 | 127.7 | 447 | |
| Extract Solution - After Beads had soaked for 24 h | Pass Through | 200 | 7 | 1 | 1.5 | 0.3 | 1.8 | |
| 1st Hour - 40° C. @ 2000 psi scCO$_2$ elution | CBD elution condition | 5 | 5840 | 1447 | 29.2 | 7.2 | 36.4 | 336.1 |
| 2nd Hour - 65° C. @ 1400 psi scCO$_2$ elution | THC elution condition | 5 | 910 | 100 | 4.5 | 0.5 | 5 | 24 |
| 3rd Hour - 67° C. @ 3400 psi scCO$_2$ elution | Total CANA elution condition | 5 | 1370 | 137 | 6.9 | 0.7 | 7.6 | 29.5 |
| After scCO$_2$ 200 mL wash with 100% EtOH | Total extract recovery | 200 | 1351 | 258 | 270.2 | 51.5 | 321.7 | |

3.3 Discussion of Results

The initial 24-hour soak of MIP in 50% EtOH+Extract, bound 99.6% of both the CBD and THC present.

From the three elution methods, a total of 13.6% CBD (cannabidiol) and 6.6% THC (tetrahydrocannabinol) was eluted from the bound cannabinoids using supercritical CO$_2$.

The total amount of recovered cannabinoids (including all three CO$_2$ elutions, the washed beaker and the 200 mL pure ethanol wash) was: 98.6% CBD and 47.8% THC, suggesting the THC has a higher affinity to the beads and is not as easily eluted off.

This experiment provided initial evidence of the potential to apply this invention to selectively separate CBD and THC (due to the difference in affinities of CBD and THC to the MIP beads and the affinities to the supercritical CO$_2$ at the different temperatures and pressures/conditions).

4. Elution with Supercritical Carbon Dioxide

4.1 Experimental

The experiment was carried out using crude cannabis extract as the input material, with the intent of determining whether supercritical CO$_2$ elution has the potential to selectively separate bound targets (cannabinoids). 5 g of non-winterised crude cannabis extract was dissolved into 200 mL of 50% EtOH solution. MIPs were added to the solution to bind the cannabinoids, then dried. The super critical CO$_2$ was run at one condition (55° C. and 2200 psi) for 1 hour. Samples of extracted oils were taken at different time periods The parameters are given in Table 7.

TABLE 7

| Parameter | Details |
| --- | --- |
| Input material | Crude, Non-winterised cannabis extract Potency of 4970 mg crude 4% THC \| 1% CBC \| 34% CBD \| 1% CBG \| 0% CBN 35% CBDA \| 1% THCA and 76% total cannabinoid content |

TABLE 7-continued

| Parameter | Details |
| --- | --- |
| Equipment | Small non-commercial/benchtop scale supercritical CO$_2$ extraction machine. Range of 20° C.-65° C. and 4500 psi max., extraction chamber is ~110 cm$^3$, Direct attachment to CO$_2$ cylinder, no flowrate control, vents directly to atmosphere. |
| MIP | Cannabinoid MIP beads (templated to bind non-covalently cannabinoids as a class) Mass: ~41 grams (est. from column size) Beads bound: 100% THC \| 100% CBC \| 96% CBD \| 100% CBG 100% CBN \| 88% CBDA \| 100% THCA from 50% EtOH |
| Processing condition | 55° C. and 2200 psi for a total of 1 hour |
| | Bound Target (input): |
| Extract bound to MIP | Physically calculated mass: About 3925 mg LCMS data on Cannabinoids shows: 3527 mg Potency 5% THC \| 41% CBD \| 39% CBDA |
| | Eluted Target (output): |
| Extract Fraction #1 | 0-20 min Potency of 64.3 mg extracted oil 2% THC \| 35% CBD \| 3% CBDA |
| Extract Fraction #2 | 20-35 min Potency of 8.2 mg of extracted oil 0% THC \| 146% CBD \| 12% CBDA |
| Extract Fraction #3 | 35-48 min Potency of 15.9 mg extracted oil 6% THC \| 107% CBD \| 6% CBDA |

TABLE 7-continued

| Parameter | Details |
|---|---|
| | Post-processing Steps: |
| Soxhlet Recovery of extract | 3370.0 mg was still bound on MIP after $CO_2$ elution (weight obtained via rotavap and tared glassware) Potency 5% THC \| 2% CBC \| 50% CBD \| 2% CBG \| 1% CBDA |

4.2 Results

The results are shown in Table 8.

The total elution from all three fractions was 88.4 mg. The total cannabinoids on MIP 3527.0 mg=2.51% total cannabinoid elution.

TABLE 8

| | Column Equivalent | Stock Volume | Solution ppm | | Calculated Amount of Cannabinoids (mg) | | Total Calculated CANA | Physically Weighed Amounts |
|---|---|---|---|---|---|---|---|---|
| | Condition | (mL) | CBD | THC | CBD | THC | (mg) | (mg) |
| Extract Solution - 5 g in 200 ml of 50% eth. | Matrix | 200 | 8359 | 1066 | 1672 | 213 | 1885 | 4970 |
| Extract Solution -After Beads had soaked for 24 h | Pass Through | 200 | 400 | 0 | 43 | 0 | 43 | 713.9 (after rotavap) |
| 20% Ethanol wash | Rinse step with 20% EtOH | 200 | 81 | 0 | 19 | 0 | 19 | 331.6 (after rotavap) |
| scCO2 Elution #1 | | 5 | 2229 | 121 | 22 | 1 | 23 | 64.3 (tared vial) |
| scCO2 Elution #2 | | 5 | 1187 | 41 | 12 | 0 | 12 | 8.2 (tared vial) |
| scCO2 Elution #3 | | 5 | 1740 | 71 | 17 | 1 | 18 | 15.9 (tared vial) |
| Recovered extract from used MIP beads (Soxhlet recovery) | | 276.5 | 6118 | 610 | 1692 | 169 | 1861 | 3370 (after rotavap) |

4.3 Discussion of Results

The results appear to show $CO_2$ elution favours CBD extraction over THC.

This experiment has provided initial evidence to support elution of bound target molecules from MIPs using supercritical $CO_2$.

This experiment further has provided initial evidence of the potential to apply this supercritical $CO_2$ extraction to selectively separate CBD and THC (due to the difference in affinities of CBD and THC to the MIP beads and the affinities to supercritical $CO_2$ at the different temperatures and pressures/conditions).

The results appear to imply that a greater mass of the cannabinoids were eluted than what was physically weighed in the sample vials. This is believed to be merely due to non-evaporated solvent, dust from the MIPs and/or difficulty of accuracy with small weights.

5. Solubilising, Binding, and Elution of Cannabis Extract

5.1 Experimental

The experiment was carried out using crude cannabis extract as the input material, with the intent of eluting cannabinoids. The following steps were followed:

100 g of extract was dissolved in 2 L of 50% EtOH, 50% water to make a solution.

MIPs were added to the solution and left to soak for 24 hours to bind all the cannabinoids, then dried ready for the supercritical $CO_2$.

45 g samples of bound MIP were weighed out for each supercritical extraction.

The supercritical $CO_2$ was loaded with a 45 g sample of dried bound MIP, and a range of pressures and temperatures were run, each as a 40 min extraction.

The parameters are given in Table 9.

TABLE 9

| Parameter | Details |
|---|---|
| Input material | Cannabis Extract, Winterised Potency 59.6% CBD |
| Equipment | Small non-commercial/benchtop scale supercritical $CO_2$ extraction machine. Range of 20° C.-65° C. and 4500 psi max. Extraction chamber is ~110 $cm^3$. Direct attachment to $CO_2$ cylinder, no flowrate control, vents directly to atmosphere. |
| MIP | Cannabinoid MIP beads (templated to non-covalently bind cannabinoids as a class) Mass: 45 g samples for each run Beads bound: 98.8% CBD |
| | Processing Conditions: |
| Initial 45 g Sample - Soxhlet | 5.36 g total extract weight (after rotavap) 3.68 g CBD was calculated (LCMS Data) Total potency is 68.7% |

TABLE 9-continued

| Parameter | Details |
|---|---|
| 2500 psi (17.3 MPa) @ 40° C. | Percent elution = 31.39% |
| 2500 psi (17.3 MPa) @ 50° C. | Percent elution = 23.59% |
| 2500 psi (17.3 MPa) @ 60° C. | Percent elution = 13.04% |
| 3000 psi (20.7 MPa) @ 40° C. | Percent elution = 32.34% |
| 3000 psi (20.7 MPa) @ 50° C. | Percent elution = 21.85% |
| 3000 psi (20.7 MPa) @ 60° C. | Percent elution = 22.45% |
| 3500 psi (24.1 MPa) @ 40° C. | Percent elution = 32.83% |
| 3500 psi (24.1 MPa) @ 50° C. | Percent elution = 31.82% |
| 3500 psi (24.1 MPa) @ 60° C. | Percent elution = 29.97% |
| 4000 psi (27.6 MPa) @ 40° C. | Percent elution = 26.30% |
| 4000 psi (27.6 MPa) @ 50° C. | Percent elution = 18.40% |
| 4000 psi (27.6 MPa) @ 60° C. | Percent elution = 30.19% |
|  | Post-processing Steps: |
| 45 g sample after scCO$_2$ - Soxhlet recovery of extract | 2.622 g of CBD still remained after CO$_2$ elution Potency = 68.3% |

5.2 Discussion of Results

The initial 24-hour soak of MIP in 50% EtOH/50% water+extract bound 98.8% of the total CBD. The binding of the extract to the MIP increased the potency by ~10%

Figure 9:
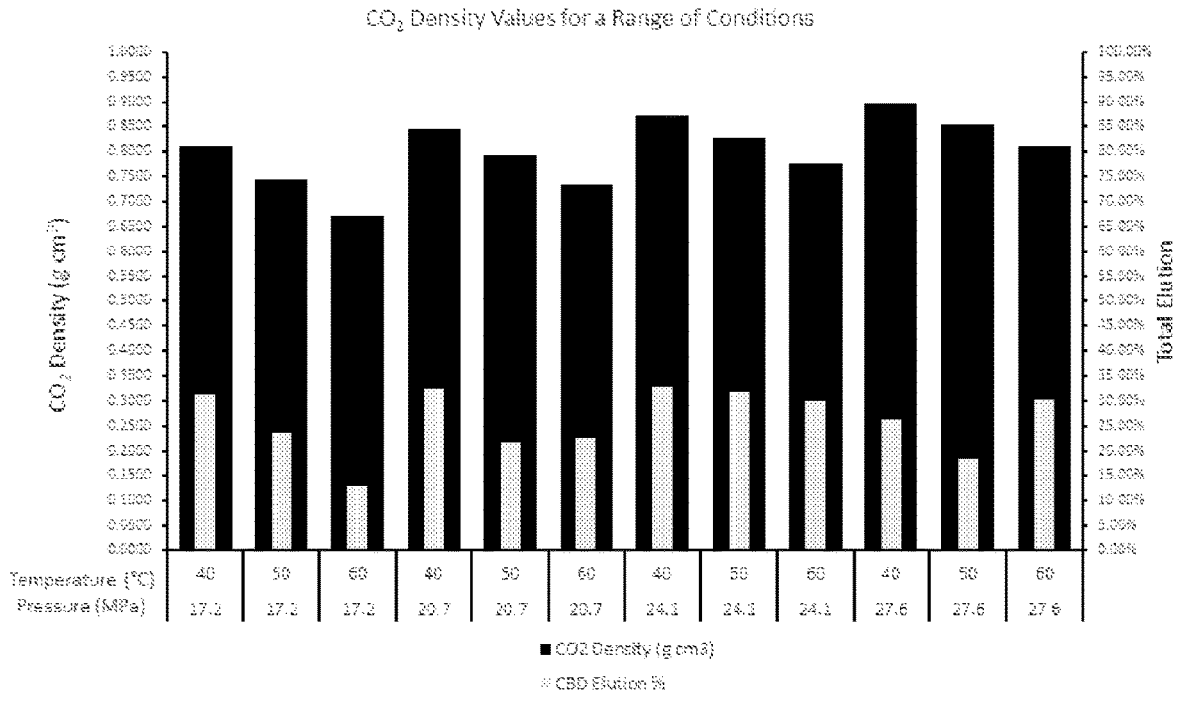
FIG. 9 shows percentages eluted compared to the density of the $CO_2$.

The percentages eluted (% of the total amount of CBD from the initial 45 g soxhlet sample, i.e. % of the 3.68 g calculated from the LCMS data) compared to the density of the CO$_2$ are shown in FIG. 9 The higher density supercritical CO$_2$ was able to dissolve and extract more CBD from the bound MIPs in the supercritical runs. In each of the pressure ranges, the lowest temperature of 40° C. had the highest extraction rates at an average of 30.72% of total CBD.

Most of the higher temperatures of each pressure range showed a decrease in extraction, one exception being when the pressure got to 4000 psi (27.6 MPa). At 60° C. it showed the highest elution in this pressure range, even though the density is less than the other two conditions set at 4000 psi (27.6 MPa).

The post-processing step shows that the CO$_2$ extraction does not elute all possible CBD, as there was still 2.622 g of CBD after a CO$_2$ extraction (done at 2500 psi (17.2 MPa) at 40° C.)

It was noted that the binding of the extract to the MIP increased the potency of the crude material from the 59.6% CBD to 68.7%.

6. Binding of Caffeine with Sub-Critical Carbon Dioxide and Elution with Super-Critical Carbon Dioxide and a Co-Solvent

6.1 Experimental

The experiment was carried out to demonstrate sequential binding and elution of MIPs, using caffeine as the target molecule.
Binding A 5 L column was packed with clean virgin MIP (see Table 10 for details).

Sub-critical CO$_2$ (986 psi & 10° C.) was pumped through the column to precool the system (MIP and column).

Using the co-solvent pump, ethanol solution containing caffeine isolate was circulated through the column with the CO$_2$. The ethanol was circulated at about 15% of the CO$_2$ flow.

Binding solution (Sub-critical CO$_2$ with 15% ethanol with caffeine) was recirculated to allow the caffeine time to bind to the MIP.

The binding solution was sampled for final concentration verification. The change in solute concentration allowed first quantitative determination of MIP absorption in CO$_2$-ethanol system at saturation.

MIP was unloaded and air/freeze dried then weighed. The difference in weight allowed a second quantitative determination of MIP absorption in CO$_2$-ethanol system at saturation. The dried MIP was ready for the elution step.
Elution A 5 L column was packed with caffeine-bound MIPs (from the above sub-critical binding).

Supercritical CO$_2$ (3002 psi and 40° C.) was pumped through the column of MIP.

The eluted target in supercritical CO$_2$ was collected in a collection chamber.

When CO$_2$ exited the column and entered the collection chamber the CO$_2$ turned from liquid to gas and was separated from the caffeine. The CO$_2$ evaporated and was recycled back to the CO$_2$ reservoir. The extract/caffeine remained in the collection chamber.

The collection chamber was rinsed with ethanol to ensure that all target was collected.

As an additional step (elution step 2), the supercritical CO$_2$ (4351 psi and 40° C.) with ethanol as a co-solvent (5.2 litres or 4.1 kg) was pumped through the column.

The eluted target was collected in a collection chamber. The collection chamber was rinsed with ethanol to ensure that all target was collected.

The general parameters of the binding and elution are given in Table 10.

TABLE 10

| Parameter | Details |
|---|---|
| MIP | MIP beads templated to non-covalently bind caffeine Mass: 2.0 kg |

TABLE 10-continued

| | Details |
|---|---|
| Equipment | Natex Super Critical Extractor 5 L Vessel Research and Development Unit. Flow rate of 30 kg/hr of $CO_2$. |
| Input material (Binding solution) | 60 grams of caffeine isolate mixed with 11,940 grams EtOH 11,940 grams = 15,133 mL (15.133 L) 60,000 mg caffeine per 15.133 L = 3965 ppm |
| Processing Conditions: | |
| Binding Sub-critical $CO_2$ + Co-solvent EtOH | $CO_2$ - 10° C. & 986 psi (68 bar, 6.8 MPa). Approx. 85 L of $CO_2$ was used (67.66 kg). Ethanol - 15 litres (11.940 kg), approx. 15% co-solvent (EtOH) flow by mass of the $CO_2$ flow. |
| Elution Step 1: Supercritical Elution | 40° C. & 3002 psi (207 bar, 20.70 MPa) |
| Elution Step 2: Supercritical + Co-solvent Elution | 40° C. & 4351 psi (300 bar, 30 MPa) Ethanol: 4095 g (5.2 L) Co-Solvent/MIP g/g: 2.25 Co-Solvent to MIP ratio based on ethanol to stripped MIP. 3.70% co-solvent to $CO_2$ flow by mass. e.g. in total 110 kg of $CO_2$ was used and 5.2 litres or 4.1 kg of EtOH. |

6.2 Results

The samples were tested using HPLC. The results are shown in Table 11.

TABLE 11

| | Mass | Result |
|---|---|---|
| Input material (Caffeine isolate) | 60.0 g | — |
| Binding: Target bound by MIP | 6.1 g | 10.2% binding |
| Elution Step 1: Target eluted from MIP | 6 g | 98.3% elution from step 1 |
| Elution Step 2: Target eluted from MIP | 0 g | 0% elution from step 2 |

6.3 Discussion of Results

MIP was used to bind caffeine from a $CO_2$/ethanol solution then the bound caffeine was eluted from the MIP using $CO_2$ as the eluent.

At 10° C. and 986 psi (68 bar) binding conditions, 2000 g of MIP bound 6.1 g of caffeine. This is equivalent to a binding capacity of 3.05 mg of caffeine per g of MIP or 10% binding efficiency based on the total initial caffeine available. It is expected that this capacity and efficiency can be further altered by adjusting the binding conditions.

Figure 10:
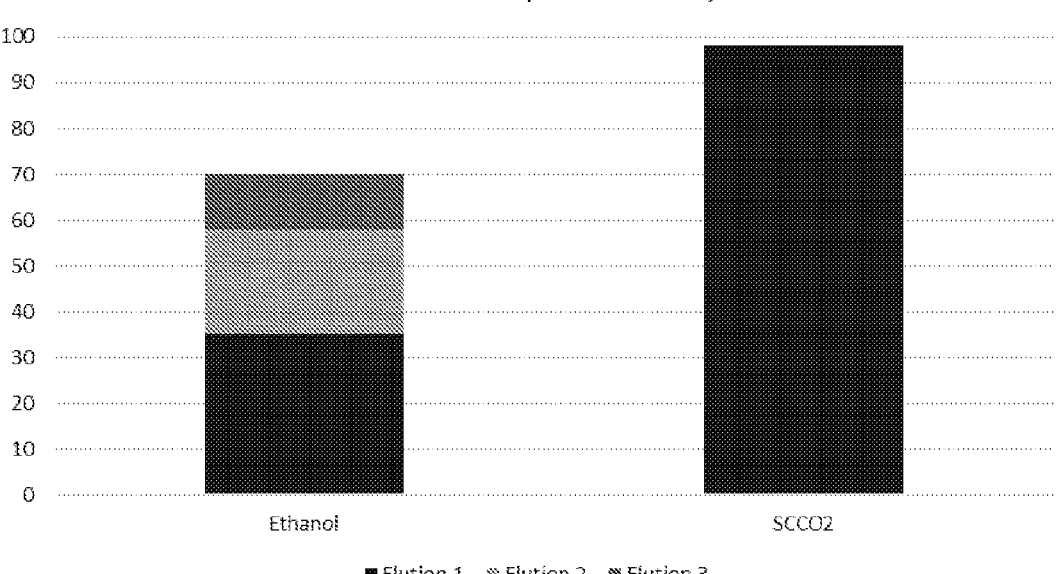
FIG. 10 shows a graph of relative efficiency of caffeine elution from a MIP with ethanol compared to supercritical carbon dioxide at 40° C. & 3002 psi (207 bar).

At 40° C. & 3002 psi (207 bar) eluting conditions using $CO_2$, approximately 98% elution of bound caffeine was achieved. For comparison FIG. 10 shows the % elution achieved used 3 cycles of ethanol (i.e. only ethanol). This result demonstrates the improved effectiveness elution with $CO_2$ provides when compared to conventional ethanol elution. A single cycle of $CO_2$ elution is able to elute 98% of bound caffeine, whereas ethanol required up to 3 elution cycles to remove 60+% of the bound caffeine.

No comparison between elution with $CO_2$ only and $CO_2$ plus co-solvent (elution step 2) was able to be made due to the majority of caffeine being eluted prior to introduction of the co-solvent.

7. Binding of Phenols with Subcritical Carbon Dioxide and Elution with Supercritical Carbon Dioxide and a Co-Solvent

7.1 Experimental

This experiment demonstrates sequential binding and elution of two phenols 4-ethylphenol and guaiacol on/from a MIP.

Binding

A 5 L column was packed with clean virgin MIP.

Sub-critical $CO_2$ (986 psi & 10° C.) was pumped through the packed column to pre-cool the system (MIP and column).

Ethanol solution containing 4-ethylphenol and guaiacol was circulated with the $CO_2$ through the column at about 15% ($CO_2$ flow) using the co-solvent pump.

Binding solution (Subcritical $CO_2$ with ethanol with phenols) was recirculated to allow the phenols time to bind to the MIP.

The ethanol was sampled for final concentration verification ($CO_2$ was allowed to evaporate off). This allowed comparison to the initial sample to calculate how much of the phenols had bound to the MIP. The change in solute concentration allows first quantitative determination of MIP absorption in $CO_2$-ethanol system at saturation.

The MIP was unloaded and air/freeze dried then weighed. The difference in weight allows a second quantitative determination of MIP absorption in $CO_2$-ethanol system at saturation.

The MIP was then dry and ready for elution.

Elution

A 5 L column was packed with 4-ethylphenol and guaiacol-bound MIPs.

Supercritical $CO_2$ (3002 psi & 40° C.) was pumped through the column.

The eluted target in $CO_2$ was collected in a collection chamber. When the $CO_2$ exited the column and entered the collection chamber the $CO_2$ turned from liquid to gas, so was separated from the phenols. The collection chamber was rinsed with ethanol to ensure that all target was collected.

As an additional step (elution step 2), supercritical $CO_2$ (4351 psi & 40° C.) with ethanol as a co-solvent was pumped through the column.

The eluted target was collected in a collection chamber. When the $CO_2$ exited the column and entered the collection chamber the $CO_2$ turned from liquid to gas, so was separated from the phenols. The collection chamber was rinsed with ethanol to ensure that all target is collected.

The general parameters of the binding and elution are given in Table 12.

TABLE 12

| | Details |
|---|---|
| Parameter | |
| MIP | MIP beads, templated to non-covalently bind small phenols |
| | Mass: 1.822 kg |
| Equipment | Natex Super Critical Extractor 5 L Vessel Research and Development Unit. |
| | Flow rate 30 kg/hr of $CO_2$. |
| Input material | 89.716 grams of solid 4-ethylphenol (4-EP) |
| (Binding solution) | 89.715 grams of liquid Guaiacol |
| | Mixed with 11,821 grams EtOH (14.982 L) |
| | 89,716 mg of 4-EP per 14.982 L |
| | 4-EP = 5988 ppm |
| | 89,715 mg of Guaiacol per 14.982 L |
| | Guaiacol = 5988 ppm |
| Processing Conditions: | |
| Binding | $CO_2$ at 10° C. & 986 psi (68 bar, 6.8 MPa) |
| Sub-critical $CO_2$ + EtOH | Ethanol 11,821 grams = 14,982 mL (14.982 L) |
| | EtOH at about 15% of the $CO_2$ flow |
| Elution Step 1: | $CO_2$ at 40° C. & 3002 psi (207 bar, 20.70 MPs) |
| Supercritical $CO_2$ Elution | |
| Elution Step 2: | $CO_2$ at 40° C. & 4351 psi (300 bar, 30 MPa), approx. |
| Supercritical $CO_2$ + Co- | 100 kg. |
| solvent (ethanol) | Ethanol: 4.474 kg (5.7 L) |
| | Co-Solvent/MIP g/g: 2.46 Co-Solvent to MIP ratio |
| | based on ethanol to stripped MIP |
| | (approx. 4.5% flow rate of the $CO_2$ by mass) |

7.2 Results

The samples were tested using HPLC. The results are shown in Table 13.

TABLE 13

| | 4-ethylphenol Mass | Guaiacol | Total Phenols | Total Result |
|---|---|---|---|---|
| Input material | 89.716 g | 89.715 g | 179.431 g | — |
| Binding: | 25.8 g | 35.7 g | 61.5 g | 34.3% |
| Target bound by MIP | | | | binding |
| Elution Step 1: | 5.73 g | 7.89 g | 13.62 g | 22.1% elution |
| Target eluted from MIP | | | | from step 1 |
| Elution Step 2: | 1.27 g | 0.26 g | 1.53 g | 3.2% elution |
| Target eluted from MIP | | | | from step 2 |

7.3 Discussion of Results

MIP was used to bind two types of phenol (4-ethylphenol and guaiacol) from a sub-critical $CO_2$ plus ethanol solution then the bound phenols were eluted from the MIP using supercritical $CO_2$ as the eluent. This demonstrated the use of $CO_2$ as a binding solvent (or co-solvent) and elution solvent for MIP processes which capture phenols.

At the 10° C. and 986 psi (68 bar) binding conditions, 1822 g of MIP bound 25.8 g of 4EP and 35.7 g of guaiacol. This is equivalent to a binding capacity of 13.71 mg of 4EP per g of MIP and 19.59 mg of guaiacol per g of MIP. This is equal to 29% binding for 4EP and 40% binding for guaiacol based on the total initial 4EP and guaiacol available. It is likely that this capacity and efficiency can be further altered by adjusting the binding conditions.

At the 40° C. & 3002 psi (207 bar) $CO_2$ elution conditions (elution step 1), approximately 5.73 g of the bound 4EP and 7.89 g of the bound guaiacol was eluted. This is equal to about 22% elution for both 4EP and guaiacol. It is of interest that under these conditions, the elution percentage was identical for both phenols whereas under the binding conditions the two phenols had different binding characteristics.

Using the 40° C. & 4351 psi (300 bar) $CO_2$ plus ethanol as a cosolvent elution conditions (elution step 2), 1.27 g of 4EP and 0.26 g of guaiacol was eluted. This is equal to about 3.2% of the remaining phenols that are believed to be bound to the MIP after elution step 1. The lower amount of recovered phenols in this step would suggest the addition of the co-solvent reduced elution efficiency. It is possible that due to the volatility of the phenols they could have flashed off and have been lost to atmosphere and not recovered.

No residual phenols were found in the samples used for HPLC several weeks later. This is believed to confirm that the phenols were eluted effectively, but that the volatile nature of the phenols means they are lost to atmosphere or possibly entrained in the $CO_2$. It is believed the mass recovery could therefore be improved by careful capture of the volatile phenols.

8. Elution of Cannabinoids from Pre-Loaded MIP Using Supercritical $CO_2$ Only and then Supercritical $CO_2$ with Co-Solvent

8.1 Experimental

This experiment demonstrated elution of CBD from MIP.

Binding 4224 g of MIP (templated to non-covalently bind cannabinoids) were pre-loaded with 150 g of CBD isolate combined with 100 grams cannabinoid extract by suspending the mixture in 10 liters of 60% ethanol and 40% water matrix solution.

The MIP was separated from the matrix solution and dried on metal trays to remove as much water and ethanol as possible.

Elution

The dry MIP (4224 g) were then placed in a 10 L basket with sintered filter discs at both ends, and the basket was then loaded into a pressure vessel.

The vessel was pressurized to the elution pressure and $CO_2$ was circulated through the vessel in an up flow direction.

After passing through the MIP, the $CO_2$ containing the dissolved extract was depressurized to approximately 50 bar and 45° C. into a first separation vessel where the extract was accumulated. Gas phase $CO_2$ was then condensed and recirculated.

Extract accumulating in the separation vessel was manually recovered through a valve periodically during the run to determine the progress of the extraction.

After a solvent:MIP ratio of 19:1 had been circulated (i.e. $CO_2$ 19 times the mass of the MIP was circulated through the MIP), the ethanol co-solvent pump was started (elution step 2) and extract collection was moved to a second separation vessel.

The $CO_2$ flow rate was halved during the co-solvent stage, and the ratio of $CO_2$:ethanol flow rate was set to approximately 2:1.

When a total ratio of 2:1 ethanol:MIP had been pumped in, the ethanol pump was stopped and neat $CO_2$ was briefly circulated (10 minutes) to remove some of the excess ethanol from the extraction basket, before slowly depressurizing the plant.

Samples were rotary evaporated to remove ethanol and the mass was recorded.

The general parameters of the binding and elution are given in Table 14.

TABLE 14

| Details | |
|---|---|
| Parameter | |
| MIP | MIP beads, templated to non-covalently bind cannabinoids |
| | Mass: 4.224 kg |
| Equipment | Super Critical Extractor approx. 10 L Vessel Research and Development Unit. |
| Input material | 150 grams of CBD isolate |
| | 100 grams cannabinoid extract. |
| | Containing in total approximately 230 g of CBD. |

TABLE 14-continued

| Details | |
|---|---|
| Processing Conditions: | |
| Binding | 10 litres of 60% ethanol and 40% water matrix solution. |
| Elution Step 1: | $CO_2$: 40° C. & 3989 psi (275 bar, 27.50 MPa) |
| Supercritical Elution: | Flow rate 26.4 kg/hr, 3.1 column volumes/hr |
| Elution Step 2: | $CO_2$: 40° C. & 3989 psi (275 bar, 27.50 MPa), |
| Supercritical + | flow rate 12.6 kg/hr, 1.4 column volumes/hr, |
| Co-solvent Elution | Ethanol: 8448 g (10.7 L), flow rate 5.6 kg/hr, 0.7 column volumes/hr |
| | (approx. 44% flow rate of the $CO_2$ by mass) |

8.2 Results

The samples were tested using HPLC. The results are shown in Table 15.

TABLE 15

| | CBD Mass | Total Result |
|---|---|---|
| Input material | 230 g | — |
| Binding: Target bound by MIP | 195 g | 85% binding |
| Elution Step 1: Target eluted from MIP | 59 g | 30% elution from step 1 |
| Elution Step 2: Target eluted from MIP | 74 g | 54.4% elution from step 2 |

8.3 Discussion of Results

This experiment demonstrated the ability to integrate a non-$CO_2$ binding step (classic solvent) and an $CO_2$ elution step together. MIP was used to bind CBD from a 60% ethanol, 40% water matrix solution using a liquid solubilising and binding procedure. Traditionally the CBD would then be eluted from the MIP using large volumes of ethanol. This traditional process produces an eluent which is CBD suspended in ethanol. The ethanol then would need to be removed using solvent recovery equipment.

This experiment provides evidence that the CBD can be eluted from the MIP using $CO_2$, this significantly reduces the traditional solvent volume utilised in this process.

At 40° C. and 3989 psi (275 bar) $CO_2$ eluting conditions (elution step 1), approximately 59 g of the bound CBD was eluted. This is equal to 30% elution of CBD.

At 40° C. and 3989 psi (275 bar) eluting conditions using $CO_2$+ethanol as a cosolvent (elution step 2), a further 74 g of CBD was eluted. This is equal to about 54% of the CBD believed to remain on the MIP after the first elution step, (or 37% of the total CBD) and indicated the improvement in CBD elution that the addition of co-solvent provided.

For comparison, when eluting with ethanol only in a similar system, the average CBD elution efficiency is 69% of total bound CBD. The use of $CO_2$+ethanol as a cosolvent (elution step 2) gave comparable results without the large quantities of ethanol.

9. Binding of CBD with Subcritical Carbon Dioxide and Elution with Supercritical Carbon Dioxide with Co-Solvent

9.1 Experimental

This experiment demonstrates sequential binding and elution of CBD from a MIP.

Binding

A vessel was loaded with 4224 g of MIP.

Cannabinoid solution containing a total 250 g of CBD extract mixed with CBD isolate in ethanol (2 litres, 1.6 kg) and was injected into the vessel using subcritical $CO_2$.

In the first pass, 1835 g of solution was injected, and 366 g was collected in a separation vessel.

The extract collected after the first pass was then fed back into the liquid tank and recirculated into the MIP packed vessel. This process was repeated six times.

A total of 2880 g of cannabinoid solution was injected into the vessel, and 169 g of carried over extract was collected from the separation vessel after the sixth pass. Small samples of each pass were taken for analysis.

Once depressurized, the MIP was mostly visibly wet with ethanol and allowed to dry off in a warm room to remove ethanol so that it would not act as a cosolvent during the $CO_2$ only phase of elution.

Elution

The dry MIPs (4224 g) were then placed in a 10 L basket with sintered filter discs at both ends, and the basket was then loaded into a pressure vessel.

The vessel was pressurized to the elution pressure and $CO_2$ was circulated through the vessel in up flow direction.

After passing through the bed, the $CO_2$ containing the dissolved extract was depressurized to approx. 50 bar and 45° C. into a first separation vessel where the extract was accumulated. Gas phase $CO_2$ was then condensed and recirculated.

Extract accumulating in the separation vessel was manually recovered through a valve periodically during the run to determine the progress of the extraction.

After a solvent:MIP ratio of 19:1 had been circulated (i.e. $CO_2$ 19 times the mass of the MIP was circulated through the MIP), the ethanol co-solvent pump was started (elution step 2) and extract collection was moved to a second separation vessel.

The $CO_2$ flow rate was halved during the co-solvent stage, and the ratio of $CO_2$:ethanol flow rate was set to approximately 2:1.

When a total ratio of 2:1 ethanol:MIP had been pumped in (i.e. 8.448 kg ethanol to 4.224 kg of MIP), the ethanol pump was stopped and neat $CO_2$ was briefly circulated (10 minutes) to remove some of the excess ethanol from the extraction basket, before slowly depressurizing the plant.

Samples were rotary evaporated to remove ethanol and the mass was recorded.

The general parameters of the binding and elution are given in Table 16.

TABLE 16

| Details | |
|---|---|
| Parameter | |
| MIP | MIP beads, templated to non-covalently bind cannabinoids<br>Mass: 4.224 kg<br>Contained approximately 30 g of residual CBD already on the MIP. |
| Equipment | Super Critical Extractor approx. 10 L Vessel Research and Development Unit. |
| Input material | 150 grams of CBD isolate<br>100 grams cannabinoid extract.<br>Containing in total 197 g of CBD.<br>(Solubilised in 2 L of 96% ethanol solution) |

TABLE 16-continued

| Details | |
|---|---|
| Processing Conditions: | |
| Binding | $CO_2$: 40° C. & 1015 psi (70 bar, 7 MPa)<br>Ethanol 2 litres (1.6 kg)<br>Ethanol flow rate 50% of the $CO_2$ flow rate by mass. |
| Elution Step 1: Supercritical Elution: | $CO_2$: 40° C. & 3989 psi (275 bar, 27.50 MPa)<br>Flow rate 24.6 kg/hr, 2.8 column volumes/hr |
| Elution Step 2: Supercritical $CO_2$ + Co-solvent | $CO_2$: 40° C. & 3989 psi (275 bar, 27.50 MPa)<br>Flow rate 11.4 kg/hr, 1.3 column volumes/hr<br>Ethanol: 8448 g (10.7 L)<br>Flow rate 5.7 kg/hr, 0.7 column volumes/hr<br>(approx. 50% flow rate of the $CO_2$ by mass) |

9.2 Results

The results are shown in Table 17.

TABLE 17

| | CBD Mass | Total Result |
|---|---|---|
| Residual CBD on MIP | 30 g | |
| Input CBD material in binding solution | 197 g | — |
| Binding:<br>Target (CBD) bound by MIP | 180 g | 91% binding |
| Total CBD on MIP after binding | 210 g | |
| Elution Step 1:<br>Target eluted from MIP | 73 g | 35% elution from step 1 |
| Elution Step 2:<br>Target eluted from MIP | 103 g | 75.2% elution from step 2 |

9.3 Discussion of Results

This experiment demonstrated the ability to integrate a subcritical $CO_2$ solubilising and binding and supercritical $CO_2$ elution together into a cannabinoid refinement process.

MIP was used to bind CBD from a subcritical $CO_2$ with ethanol cosolvent matrix containing CBD. This suggests $CO_2$ (optionally with cosolvent) could be used to extract CBD or cannabinoids from plant material (see examples 1 and 2), then the liquid fed to the MIP for binding. This could potentially allow in line winterisation or refinement. Once cannabinoids are bound to the MIP, supercritical $CO_2$ with or without cosolvent could be used to elute them from the MIP into a refined form. Utilising this approach also removes the need for a water/ethanol matrix for solubilising and is an alternative low liquid matrix option to the traditional matrix binding methods.

At 40° C. & 1015 psi (70 bar), approximately 91% CBD (180 g) was bound to the MIP. This is equal to a binding capacity of 43 mg/g. It is likely that this could be optimised by altering the $CO_2$ temperature and pressure. For comparison, when binding using water and ethanol, the average CBD binding is 78%. Without wishing to be bound by theory, the high binding may be due to $CO_2$ being a relatively poor solvent for cannabinoids but being a good penetrative solvent. This double effect may provide the CBD good access to the complete internal structure of the MIP where it binds to the MIP due to its favourable interaction with the MIP instead of the $CO_2$.

At 40° C. and 3989 psi (275 bar) $CO_2$ eluting conditions (elution step 1), approximately 73 g of the bound CBD was eluted. This is equal to 35% elution of CBD.

At 40° C. and 3989 psi (275 bar) $CO_2$+ethanol cosolvent eluting conditions (elution step 2), 103 g of CBD was eluted. This is equal to 49% elution of the total CBD (or about 75% of the CBD believed to remain on the MIP after elution step 1) and indicated the improvement in CBD elution that the addition of co-solvent provided.

For comparison, when eluting with ethanol only in a similar system, the average CBD elution efficiency is 69%.

For comparison, the elution efficiency of CBD from MIP in a similar system using only ethanol ranges from 2-8 g of CBD per litre of ethanol. When ethanol was used in this experiment in the presence of $CO_2$, the efficiency was 9.6 g of CBD per litre of ethanol. This was likely to be higher, if a significant portion of CBD had not already been removed in the first phase of the experiment where $CO_2$ only was used at the eluent.

In this example the MIP used had 30 g (0.7%) of residual CBD already bound to the MIP. When a MIP purification process is used in an industrial process it is likely the MIP will contain residual bound target molecule, as removal of all the target molecule between cycles takes time and is likely unnecessary. Use of the MIP with 0.7% residual CBD content therefore may simulate binding to a MIP in a commercial setting where economic or time constraints prevent returning the MIP back to zero residual target content.

The invention claimed is:

1. A method of obtaining at least one target molecule from a source material, the method comprising:

a) bringing a source material into contact with a molecularly imprinted polymer (MIP) to associate at least one target molecule present in the source material with the MIP, and, b) eluting the at least one target molecule off the MIP using fluid carbon dioxide as an elution solvent, wherein the fluid carbon dioxide used as an elution solvent is at a pressure of above about 7 MPa and a temperature of above about 31° C., or wherein the fluid carbon dioxide used as an elution solvent is at a pressure of about 0.5 to 41 MPa and a temperature of about −50 to 30° C., and wherein the source material is in a binding solvent when it is brought into contact with the MIP, wherein the binding solvent comprises fluid carbon dioxide at a density that is lower than the density of the fluid carbon dioxide used as the elution solvent, wherein the source material is solubilised in at least one solvent prior to being brought into contact with the MIP, and wherein the at least one solvent comprises fluid carbon dioxide with a higher density than the fluid carbon dioxide used as the binding solvent.

2. The method of claim 1, wherein the fluid carbon dioxide used as an elution solvent is at a pressure of about 7 to 100 MPa and a temperature of about 31 to 70° C.

3. The method of claim 1, wherein the fluid carbon dioxide used as an elution solvent is at a pressure of about 5 to 30 MPa and temperature of about −10 to 25° C., or the fluid carbon dioxide used as an elution solvent is at a pressure of about 7 to 15 MPa and temperature of about 10 to 25° C.

4. The method of claim 1, wherein the fluid carbon dioxide used as an elution solvent is supercritical carbon dioxide.

5. The method of claim 4, wherein the supercritical carbon dioxide used as an elution solvent has a density of about 0.4 to 1.0 g/cm³.

6. The method of claim 1, wherein the fluid carbon dioxide used as an elution solvent is subcritical carbon dioxide.

7. The method of claim 6, wherein the subcritical carbon dioxide used as an elution solvent has a density of about 0.1 to 1.1 g/cm³.

8. The method of claim 1, wherein the elution solvent further comprises at least one co-solvent.

9. The method of claim 8, wherein the at least one co-solvent is selected from one or more of water, ethanol, methanol, ethyl acetate, isopropyl alcohol, acetonitrile, acetone, and tetrahydrofuran (THF); and/or wherein the at least one co-solvent is greater than 0% to about 75% volume of the fluid carbon dioxide elution solvent or greater than 0% to about 20% of mass flow of the fluid carbon dioxide elution solvent.

10. The method of claim 1, wherein the source material is any one or more of a liquid, a wax, an oil, a solid and/or an extract of an animal, plant or synthetic source material.

11. The method of claim 1, wherein the binding solvent comprises supercritical carbon dioxide; or wherein the binding solvent comprises subcritical carbon dioxide.

12. The method of claim 1, wherein the binding solvent comprises fluid carbon dioxide and at least one co-solvent.

13. The method of claim 12, wherein the at least one co-solvent is selected from one or more of water, ethanol, methanol, ethyl acetate, isopropyl alcohol, acetonitrile, acetone, and tetrahydrofuran (THF); and/or wherein the at least one co-solvent is greater than 0% to about 75% of mass flow of the liquid or fluid carbon dioxide.

14. The method of claim 1, wherein the source material is solubilised in fluid carbon dioxide and at least one co-solvent.

15. The method of claim 14, wherein the at least one co-solvent is selected from the group consisting of one or more of water, ethanol, methanol, ethyl acetate, isopropyl alcohol, acetonitrile, acetone, and tetrahydrofuran (THF).

16. The method of claim 15, wherein the source material is solubilised in supercritical carbon dioxide; or wherein the source material is solubilised in subcritical carbon dioxide.

17. A system for obtaining at least one target molecule from a source material, the system comprising:

a molecularly imprinted polymer (MIP), and a device for providing a flow of fluid carbon dioxide, wherein the system is adapted to bring a source material into contact with a molecularly imprinted polymer to associate at least one target molecule present in the source material with the molecularly imprinted polymer, and wherein the system is adapted to elute the target molecule that is associated with the molecularly imprinted polymer using the flow of fluid carbon dioxide as an elution solvent, and wherein the fluid carbon dioxide is at a pressure of above about 7 MPa and temperature of above about 31° C., or wherein the system is adapted to elute the target molecule that is associated with the molecularly imprinted polymer using the flow of fluid carbon dioxide as an elution solvent, and wherein the fluid carbon dioxide is at a pressure of about 0.5 to 41 MPa and a temperature of about −50 to 30° C., and wherein the source material is in a binding solvent when it is brought into contact with the MIP, wherein the binding solvent comprises fluid carbon dioxide at a density that is lower than the density of the fluid carbon dioxide used as the elution solvent, wherein the source material is solubilised in at least one solvent prior to being brought into contact with the MIP, and wherein the at least one solvent comprises fluid carbon dioxide with a higher density than the fluid carbon dioxide used as the binding solvent.

18. A method of obtaining at least one target molecule from a source material, the method comprising:

a) bringing a source material into contact with a molecularly imprinted polymer (MIP) to associate at least one target molecule present in the source material with the MIP, and b) eluting the at least one target molecule off the MIP using fluid carbon dioxide as an elution solvent, wherein the fluid carbon dioxide used as an elution solvent is at a pressure of above about 7 MPa and a temperature of above about 31° C., or wherein the fluid carbon dioxide used as an elution solvent is at a pressure of about 0.5 to 41 MPa and a temperature of about −50 to 30° C., and wherein the source material is in a binding solvent when it is brought into contact with the MIP and the binding solvent does not comprise fluid carbon dioxide.

19. The method of claim 18, wherein the binding solvent is selected from any one or more of water, ethanol, methanol, ethyl acetate, isopropyl alcohol, acetonitrile, acetone, and THF.

\* \* \* \* \*